United States Patent
Wang et al.

(10) Patent No.: US 10,928,975 B2
(45) Date of Patent: Feb. 23, 2021

(54) ON-THE-FLY ADJUSTMENT OF ORIENTATION OF VIRTUAL OBJECTS

(71) Applicant: MICROSOFT TECHNOLOGY LICENSING, LLC, Redmond, WA (US)

(72) Inventors: Jia Wang, Isaaquah, WA (US); Joshua Benjamin Eiten, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/515,017

(22) Filed: Jul. 17, 2019

(65) Prior Publication Data

US 2021/0019036 A1 Jan. 21, 2021

(51) Int. Cl.
| | |
|---|---|
| *G06F 3/0481* | (2013.01) |
| *G06F 3/0484* | (2013.01) |
| *G06F 3/0346* | (2013.01) |
| *G06F 3/01* | (2006.01) |

(52) U.S. Cl.
CPC .......... *G06F 3/04815* (2013.01); *G06F 3/011* (2013.01); *G06F 3/0346* (2013.01); *G06F 3/04845* (2013.01); *G06F 3/04842* (2013.01)

(58) Field of Classification Search
CPC .... G06F 3/04815; G06F 3/011; G06F 3/0346; G06F 3/04845; G06F 3/04842; G06T 2219/2004; G06T 7/60; G06T 19/20; G02B 27/0172
USPC .................................................. 345/156, 157
See application file for complete search history.

(56) References Cited

U.S. PATENT DOCUMENTS

2018/0059777 A1* 3/2018 Kobayashi .............. G06F 3/017

\* cited by examiner

*Primary Examiner* — Jennifer T Nguyen
(74) *Attorney, Agent, or Firm* — NovoTechIP International PLLC

(57) ABSTRACT

Techniques for interacting with a three-dimensional (3D) virtual environment including receiving a first user input for selecting a first virtual object; identifying, in response to the first user input, the first virtual object as a currently selected virtual object; receiving a second user input for activating an object reorientation mode; activating, in response to the second user input, an object reorientation mode; receiving a third user input indicating changes in pose of a hand; receiving, while the first virtual object has remained a currently selected virtual object the object reorientation mode has remained active, a fourth user input; identifying a first orientation of a reference virtual object; and changing, in response to receiving the fourth user input, an object space orientation of the first virtual object to having the first orientation from a different second orientation.

20 Claims, 26 Drawing Sheets

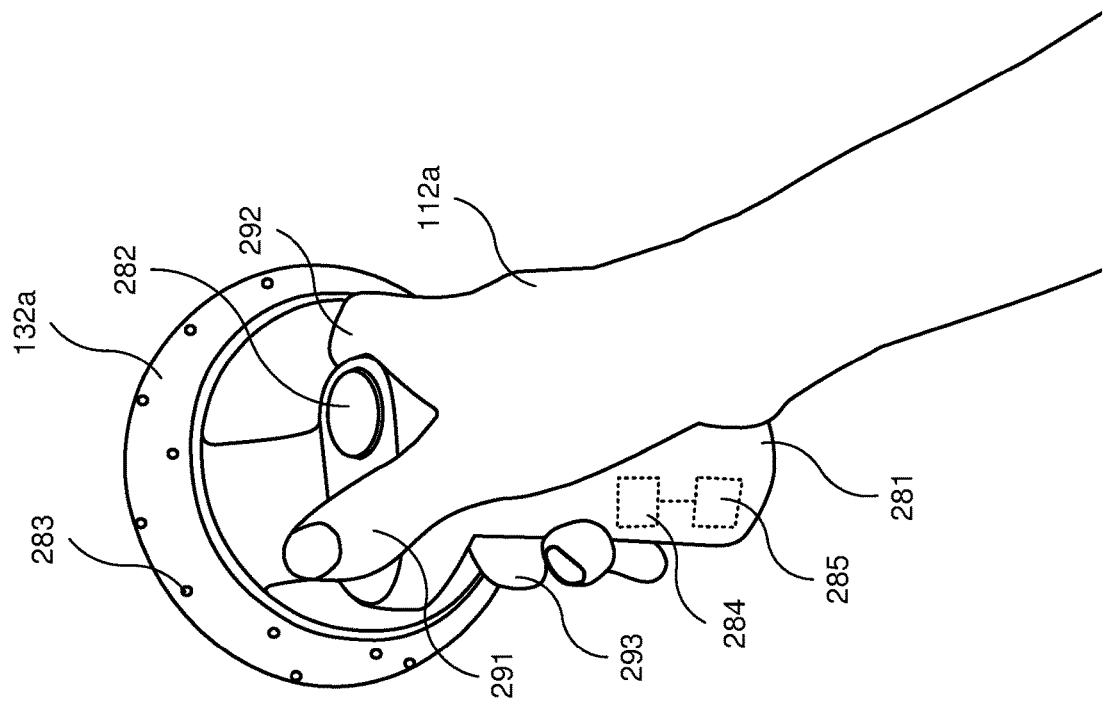
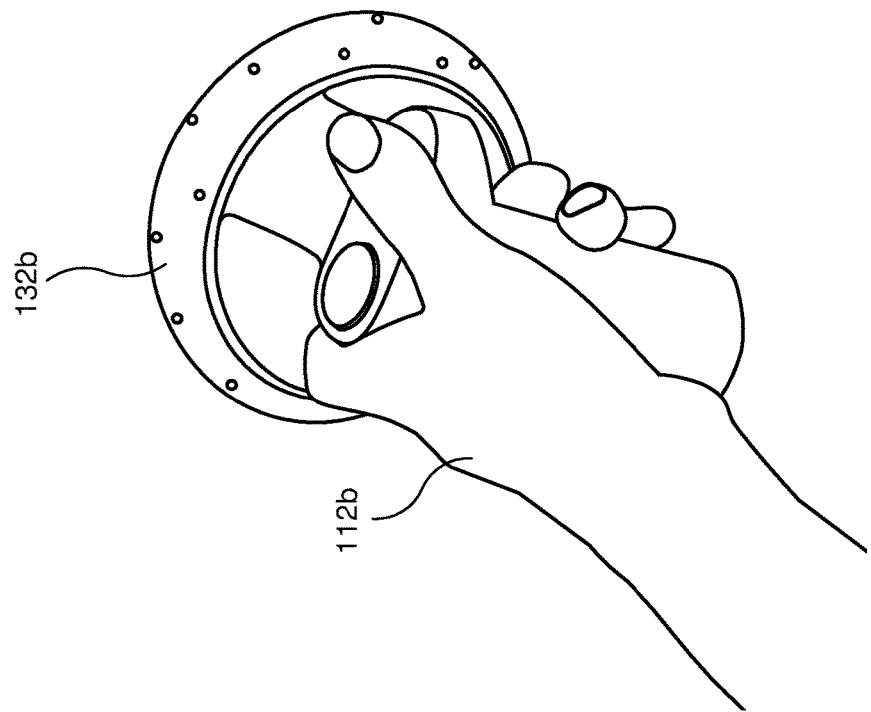
FIG. 4

ON-THE-FLY ADJUSTMENT OF ORIENTATION OF VIRTUAL OBJECTS

BACKGROUND

An object space orientation and pivot point of a three-dimensional (3D) virtual object provides a reference frame for a spatial transform of a mesh, which can be defined in modeling packages such as Maya and Blender. When a model created with a creator modeling application is imported into a different mixed reality (MR) application, an orientation and/or pivot point of the imported model can appear incorrect in comparison to a shape of a model presented to a human. In some cases, this is due to errors in authoring the model, while in other cases it is due to differences between an export of the model by the creator modeling application and import by the consuming MR application. In some cases, the model's author will re-edit an object space orientation and/or pivot point of the model in the creator modeling application and repeat the export and import process until it looks correct in the consuming MR application. However, this approach requires action by the author, use of the creator modeling application, and may not solve the issue for other consuming applications.

Another manifestation of the problem is when multiple 3D virtual objects ("component virtual objects" or "component objects") are grouped together to form a complex object. An object space orientation and pivot point for the grouped complex object will provide a reference frame for manipulation of the group. However, it is difficult for software to automatically determine, based on multiple different object space orientations and pivot points for the component virtual objects, a correct object space orientation and pivot point for the grouped complex virtual objects. For software, the component virtual objects do not provide information that can be consistently evaluated to correctly identify forward and/or upward directions. This may result in, an undesirable object space orientation and/or pivot point taken from an arbitrarily (from a user perspective) component virtual object, such as a first or last component virtual object selected for identifying the group of component virtual objects.

In many MR spatial authoring tools such as Tilt Brush™, Google Blocks™, and SketchBox™, imported models keep the object space orientation and pivot point properties defined in the creator modeling application. Complex virtual objects generally use default values such as a world space orientation, or an orientation of a first child virtual object. In desktop 3D applications, such as Blender, a 3D editing cursor is sometimes offered. The cursor has an orientation and position that can provide a reference frame when manipulating a selected virtual object. However, this approach conventionally relies on performing sequences of mouse, keyboard, and/or menu operations that, while acceptable for desktop applications on a monitor, are more difficult and/or inconvenient to perform in MR environments that do not conveniently permit such operations. For example, such operations often do not translate well to hand-operated motion controllers.

SUMMARY

A system for interacting with a three-dimensional (3D) virtual environment, in accord with a first aspect of this disclosure, including a logic subsystem and one or more machine readable media having instructions stored thereon which, when executed by the logic subsystem, cause the system to receive a first user input for selecting a first virtual object in the 3D virtual environment, and identify, at a first time in response to the first user input, the first virtual object as a currently selected virtual object. In addition, the instructions cause the system to receive a second user input for activating an object reorientation mode, and activate, at a second time in response to the second user input, an object reorientation mode. The instructions also cause the system to receive, at or before a third time, a third user input indicating changes in pose of a hand, and receive, at the third time while the first virtual object has remained a currently selected virtual object since the first time and while the object reorientation mode has remained active since the second time, a fourth user input. Furthermore, the instructions cause the system to identify, for the third time, a first orientation of a reference virtual object, and change, in response to receiving the fourth user input, an object space orientation of the first virtual object to having the first orientation from a different second orientation.

A method for interacting with a three-dimensional (3D) virtual environment, in accord with a second aspect of this disclosure, includes receiving a first user input for selecting a first virtual object in the 3D virtual environment, and identifying, at a first time in response to the first user input, the first virtual object as a currently selected virtual object. In addition, the method includes receiving a second user input for activating an object reorientation mode, and activating, at a second time in response to the second user input, an object reorientation mode. The method also includes receiving, at or before a third time, a third user input indicating changes in pose of a hand, and receiving, at the third time while the first virtual object has remained a currently selected virtual object since the first time and while the object reorientation mode has remained active since the second time, a fourth user input. Furthermore, the method includes identifying, for the third time, a first orientation of a reference virtual object, and changing, in response to receiving the fourth user input, an object space orientation of the first virtual object to having the first orientation from a different second orientation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 illustrates an example of the first handheld 3D hand pose tracking apparatus and the second handheld 3D hand pose tracking apparatus shown in FIGS. 1 and 3;

FIG. 19 shows a user view of a virtual object with a bounding box featuring object reorientation elements; FIG. 20 shows a user view in which an object reorientation element has been used to activate an object reorientation mode and an initial change in an orientation of the bounding box using two controller avatars coupled to faces of the bounding box; FIG. 21 shows a user view in which the orientation of the bounding box has been further changed using the coupled controller avatars; and FIG. 22 shows a view in which an object space orientation of the virtual object has been reoriented to match the new orientation of the bounding box.

FIG. 23 shows an initial user view of a virtual object within its bounding box; FIG. 24 shows a user view in which the virtual object of FIG. 23 has been rotated according to a change in pose of a controller avatar; and FIG. 25 shows a user view in which an object space orientation of the rotated virtual object of FIG. 24 has been reoriented to match the orientation of the virtual object in FIG. 23 and its bounding box in FIGS. 23 and 24.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
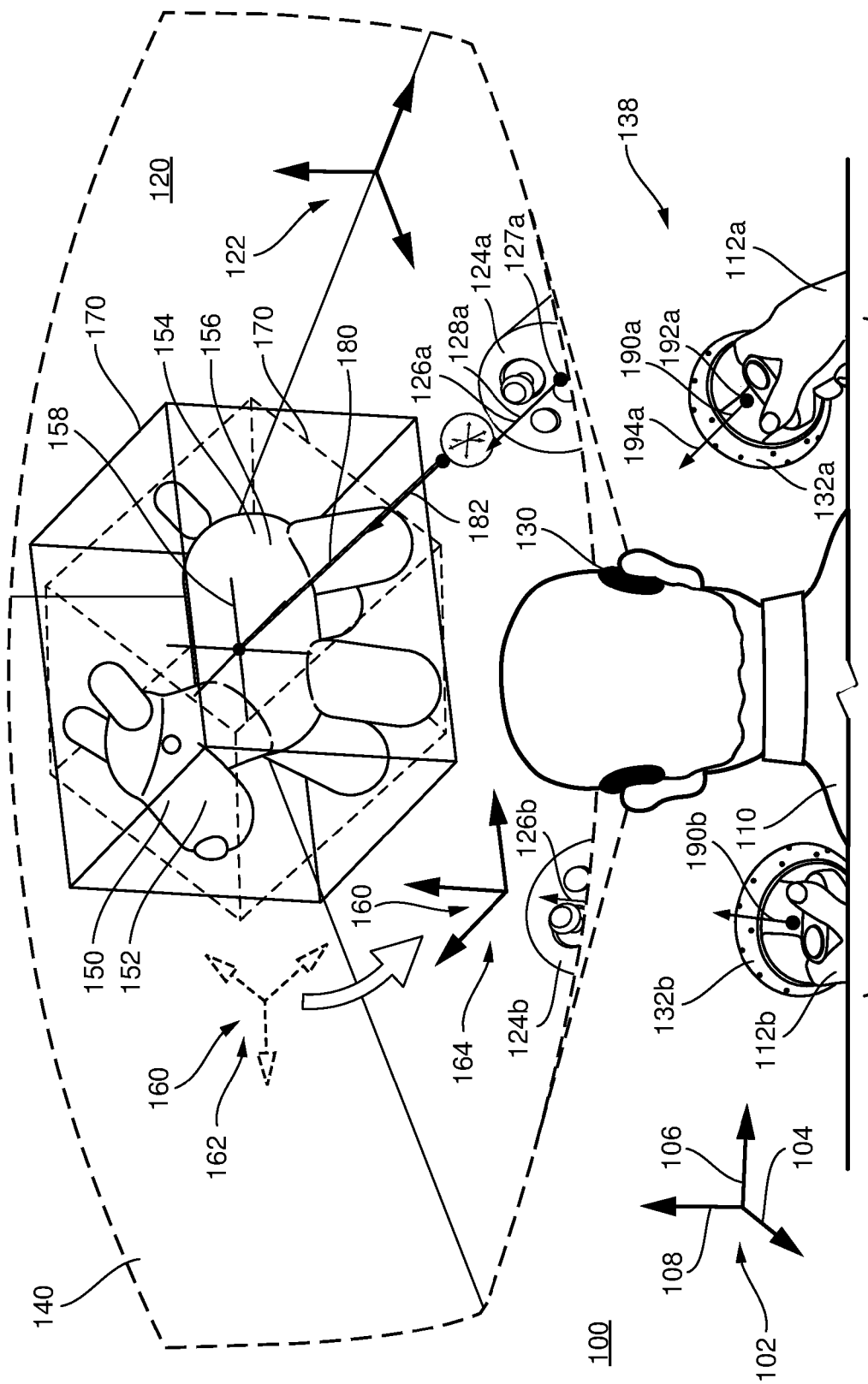
FIG. 1 illustrates an example of a user in a physical environment interacting with a three-dimensional virtual environment via a mixed reality or virtual reality ("MR/VR") device.

FIG. 1 illustrates, for a first time, an example of a user 110 in a physical environment 100 interacting with a first three-dimensional virtual environment 120 ("virtual environment") via a mixed reality or virtual reality ("MR/VR") device 130. A virtual environment may be referred to as a "virtual scene" or a "scene." FIG. 1 shows a three-dimensional physical space orientation 102 ("physical space orientation") and respective three orthogonal axes, 104, 106, and 108, corresponding to a coordinate system for the physical environment 100. The physical environment 100 illustrated in FIG. 1 is merely a simplified example for discussion purposes, and is not intended to be limiting on types of physical environments. In the example illustrated in FIG. 1, the user 110 is wearing and actively using the MR/VR device 130. In the example illustrated in FIG. 1, the MR/VR device 130 is a head mounted MR/VR device (such as HoloLens™ augmented reality devices by Microsoft Corporation of Redmond, Wash., US) allowing the user 110 to directly view the physical space 100 in combination with virtual graphical elements displayed by the MR/VR device 130, and includes the elements of the MR/VR device 130 illustrated in FIGS. 2A and 2B. However, it is understood that the illustrated MR/VR device 130 is merely an example implementation, and that any of the various other examples of MR/VR devices described herein may also be used to implement the disclosed techniques.

In some implementations, the user 110 is holding and manipulating one or more handheld three-dimensional hand pose tracking apparatuses 132 with respective hands 112. In FIG. 1, a first handheld 3D hand pose tracking apparatus 132a is used with a first hand 112a ("right hand"). As shown in FIG. 1, in some examples a similar second handheld 3D hand pose tracking apparatus 132b is used with a second hand 112b ("left hand"). For purposes of this discussion, a 3D hand pose tracking apparatus 132 may also be referred to as a "hand pose tracking apparatus," "hand pose tracking apparatus," "motion controller," or "input device." In this particular example, the hand pose tracking apparatuses 132 and the MR/VR device 130 operate together as elements of a three-dimensional hand pose tracking subsystem 134 ("hand pose tracking subsystem" or "hand pose tracking subsystem"), although the 3D hand pose tracking subsystem 134 is not limited to such embodiments. For example, in some implementations, a hand pose is tracked for a hand without use of a handheld hand pose tracking apparatus 132 for that hand 112, but instead through gesture recognition techniques performed using image sensors. The 3D hand pose tracking subsystem 134 is included in a user input subsystem 136 configured to, in addition to determine changes in hand pose, identify and report other forms of user input including, but not limited to, spoken commands, eye gaze detection, and/or actuations of buttons or other input sensors included in a hand pose tracking apparatus 132. The 3D hand pose tracking system 134 determines changes in one or more hand poses 190 including, in FIG. 1, a first hand pose 190a, including a 3D position 192a ("position") and/or a 3D orientation 194a ("orientation"), in the physical space 100 for the right hand 112a and/or the first hand pose tracking apparatus 132a, and likewise determines changes in a second hand pose 190b for the left hand 112b and/or the second hand pose tracking apparatus 132b. In FIG. 1, the orientation 194a is shown as a direction vector, which may correspond to the axis of an axis-angle representation of the orientation 194a. The MR/VR device 130, hand pose tracking apparatuses 132, 3D hand pose tracking subsystem 134, and/or user input subsystem 136 are included in an MR/VR system 138.

FIG. 1 also illustrates a first user view 140 of a portion of the first virtual environment 120, including virtual objects within a field of view (FOV) of an associated virtual camera, rendered for display to the user 110 and presented to the user 110 by the MR/VR system 138. In some examples, the first user view 140 is presented as a series of rasterized frames presented via a display device to the user 110. The user 110 is interacting with the first virtual environment 120 via the MR/VR device 130 and user input obtained using the user input subsystem 136, including, but not limited to, actuations of buttons included in a hand pose tracking apparatus 132 and/or changes in a hand pose 190 determined by the 3D hand pose tracking system 134. User inputs relating to changes in hand pose resulting in a corresponding change in a pose in a virtual environment may be referred to as "user navigation inputs." FIG. 1 shows a first global space orientation 122 (which may also be referred to as a "world space orientation") corresponding to a global coordinate system for the first virtual environment 120. A space orientation may also be referred to as a "transform orientation" or an "orientation." It is understood that the space orientations shown in the drawings, such as various global space orientations and object space orientations, are not positioned to indicate any particular coordinate position, such as an origin of a respective coordinate system.

Hand motion input source poses 126 in the first virtual environment 120 are generated and changed based on at least the changes in hand poses 190 determined by the 3D hand pose tracking system 134. A hand motion input source pose may be referred to as a "hand input source pose" or "input source pose." In some implementations, the first user view 140 includes a hand input virtual object 124 ("input controller virtual object", "controller avatar", or "controller") displayed for and in a respective hand motion input source pose 126 ("controller pose" or "input controller pose"). In the example shown in FIG. 1, the first user view 140 includes a first hand input virtual object 124a in a first hand motion input source pose 126a (with a position 127a ("hand input source position" or "input source position") and orientation 128a ("hand input source orientation" or "input source orientation"), responsive to changes in the first hand pose 190a for the right hand 112a, and a second hand input virtual object 124b in a second hand motion input source pose 126b responsive to changes in the second hand pose 190b for the left hand 112b. In addition to indicating a hand motion input source pose 126 in the first virtual environment 120, a hand input virtual object 124 may, as shown in the figures, provide interactive user interface (UI) elements (which may, in some examples, be referred to as "affordances") configured to, for example, display application state (such as, but not limited to, visual indicators acknowledging user inputs and/or operating mode) and/or generate user input events for the application (such as, but not limited to, via UI elements that generate user commands for the application). The first user view 140 also includes a first virtual object 150 (which may also be referred to as an "object", "virtual model", or "model") included in the first virtual environment 120. Simply for the purposes of example, the first virtual object 150 appears in the shape of a dog. In some examples, the first virtual object 150 is instantiated based on an imported virtual model. In this example, the first virtual object 150 is a complex virtual object, comprising a plurality of component virtual objects (which may be referred to as "subobjects" of the complex virtual object) including a first component virtual object 154. In some examples, the complex virtual object and/or its component virtual objects are each a "parent" of one or more "child" objects and/or a "child" of a "parent" object. It is understood the features of the first virtual environment 120 illustrated in FIG. 1, including the first virtual object 150, are not physical entities, but are virtual entities displayed, and accordingly visible to, the user 110 via the MR/VR device 130.

FIG. 1 also illustrates, with broken lines, a first object space orientation 160 for the first virtual object 150 at a second time before the first time, when it had a first orientation 162, and a first bounding box 170 for the first virtual object 150 oriented according to the first object space orientation 160 at the second time. An object space orientation may be referred to as a "local orientation" or "local transform orientation" and corresponds to an object coordinate system for a virtual object (for example, for defining poses of component objects of the virtual object relative to the virtual object). In some examples, the first orientation 162 may have been expressly specified by an imported virtual model used to instantiate the first virtual object 150 or automatically generated (for example, using the first global space orientation 122 or an object space orientation of a component virtual object). A can be seen from the broken line representation of the first bounding box 170, the first orientation 162 is not well aligned with the feet of the dog-shaped first virtual object 150. By use of the techniques described herein, the user 110 has quickly and accurately reoriented the virtual object 150 to a new orientation 164 by use of at least the first hand pose tracking apparatus 132a.

In this example, in response to a first user input (which may be referred to as a "user input event" or "input event") provided by the user 110, the first virtual object 150 has been selected as a currently selected virtual object 152. Further, in response to a second user input provided by the user 110 has activated (or "entered") a first object reorientation mode (which may be referred to as a "reorientation mode", "reorientation operating mode," "object orientation mode", or "orientation mode"). While the first object reorientation mode is active, in response to a third user input indicating changes in the first hand pose 190a (determined by the hand pose tracking system 134 and resulting in corresponding changes in the first hand motion input source pose 126a indicated by the first hand input virtual object 124a), a first object selection pose 182 of a user-directed first object selection ray 180 is directed to intersect with the first component object 154. Based on a determination that the first object selection ray 180 is pointed at the first component object 154, the first component object 154 is selected as a first reference virtual object 156 (which may be referred to as a "reference object", "target virtual object", or "target object"). In some implementations, user input events are generated in response to the first object selection ray 180 intersecting or no longer intersecting with a virtual object. As discussed in further detail below, the object selection pose 182 for the first object selection ray 180 changes according to changes in the first hand motion input source pose 126a, which consequently changes which virtual objects intersect the first object selection ray 180. While the first component object 154 is selected as the first reference virtual object 156 using the first object selection ray 180 and the first object reorientation mode remains active, a first reference object orientation indicator 158, showing the first reference virtual object 156 has a second orientation 164 ("reference object orientation"), is displayed to the user 110 in the first user view 140.

In response to a fourth user input provided by the user 110 (in some examples, identified by the hand pose tracking system 134) while the first component object 154 is selected as the first reference virtual object 156 and the first object reorientation mode remains active, the first virtual object 150 is reoriented (in other words, the first object space orientation 160 for the first virtual object 150 is changed) from the first orientation 162 to the second orientation 164 of the first reference virtual object 156. Accordingly, FIG. 1 illustrates the first bounding box 170 oriented according to the second orientation 164 used as the first object space orientation 160 of the first virtual object 150 at the first time. In various implementations, each of the first user input, the second user input, the third user input, and the fourth user input may be generated by the user input subsystem 136 (for example, in response to changes in a hand pose 190 and/or resulting changes in a hand motion input source pose 126, user interaction with an input sensor of a 3D hand pose tracking apparatus 132, or a voice command) and/or an application (for example, a user input resulting from the user 110 interacting with a UI element within the first virtual environment 120, such as a UI element provided by a hand input virtual object 124).

Figure 2:
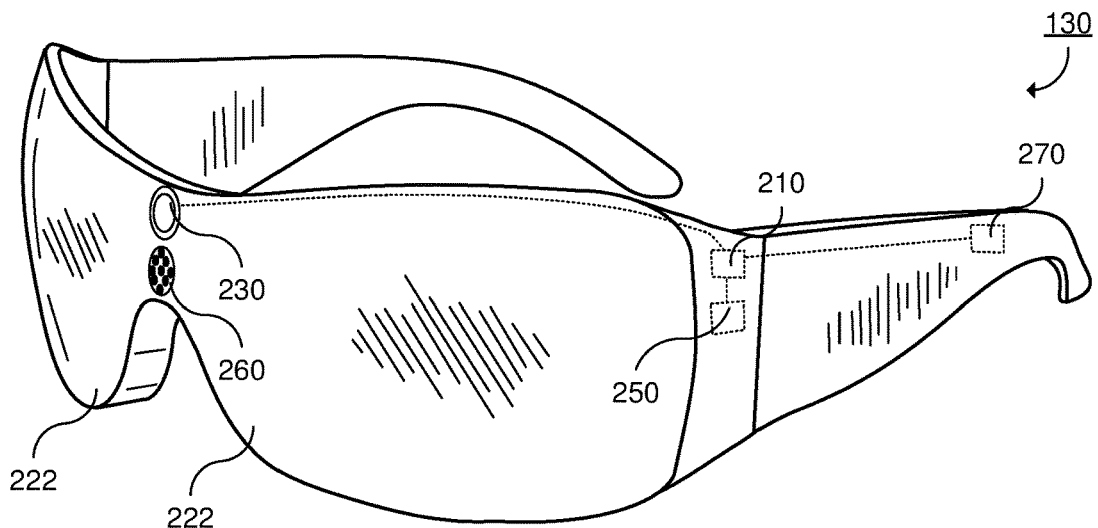
FIG. 2 illustrates and describes examples of the MR/VR device shown in FIG. 1.
Figure 3:
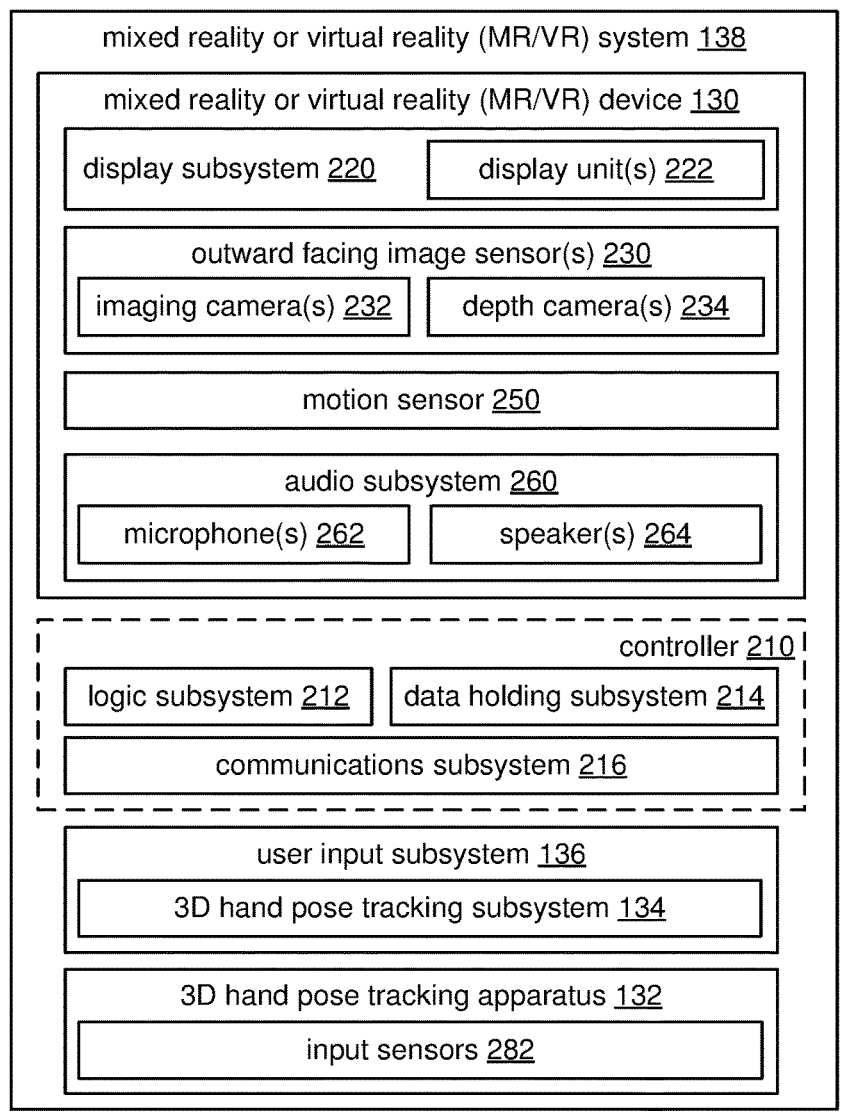
FIG. 3 is a block diagram illustrating examples of the MR/VR device of FIGS. 1 and 2 and an MR/VR system including the MR/VR device.

FIG. 2 illustrates and describes examples of the MR/VR device 130 shown in FIG. 1, and FIG. 3 is a block diagram illustrating examples of the MR/VR device 130 of FIGS. 1 and 2 and the MR/VR system 138 including the MR/VR device 130. In the example illustrated in FIG. 2, the MR/VR device 130 is a head mounted MR/VR device, intended to be worn on a user's head during ordinary use, that includes a head mounted display (HMD) device. However, it is noted that this disclosure is expressly not limited to head mounted MR/VR devices, and techniques described herein may be used with other types of MR/VR devices, including, but not limited to, smartphone devices, tablet computers, notebook computers, and devices or systems including heads up displays that are configured to provide MR/VR capabilities.

The MR/VR device 130 includes a display subsystem 220 for displaying images to a user of the MR/VR device 130. In the example illustrated in FIG. 2, the display subsystem 220 is intended to be close to a user's eyes and includes a see-through HMD device. For example, the HMD device can include one or more transparent or semi-transparent display unit(s) 222 with see-through lenses arranged such that images may be presented via the see-through lenses (for example, via waveguides or image-producing elements located within the see-through lenses). A user wearing an example of the MR/VR device 130 with see-through lenses has an actual direct view of a surrounding physical environment (instead of image representations of the real-world space) through the see-through lenses, and at the same time a view of virtual objects (which may be referred to as "virtual images" or "holograms") that augment the user's direct view of the physical environment. It is noted that this disclosure is expressly not limited to MR/VR devices using see-through display units. In some implementations, the display unit(s) 222 may be non-transparent and block, in all or part of a user's field of view, or otherwise prevent the user from directly viewing the surrounding physical environment through the display unit(s) 222. Such implementations include, but are not limited to, augmented reality devices arranged to display visual images of the physical environment in front of the MR/VR device 130 with virtual objects added to the displayed visual images to augment the display of the physical environment, and virtual reality devices arranged to display virtual objects within virtual environments.

The MR/VR device 130 further includes one or more outward facing image sensors 230 configured to acquire image data for the physical environment around and/or in front of the MR/VR device 130. The outward facing image sensors 230 may include one or more digital imaging camera(s) 232 arranged to capture two-dimensional visual images. In some implementations, two imaging camera(s) 232 may be used to capture stereoscopic images. The outward facing imaging sensors 230 may also include one or more depth camera(s) 234, such as, but not limited to, time of flight depth cameras, arranged to capture depth image data, such as a depth map providing estimated and/or measured distances from the MR/VR device 130 to various portions of a field of view (FOV) of the depth camera(s) 234. Depth image data obtained via the depth camera(s) 234 may be registered to other image data, such as images concurrently captured via imaging camera(s) 232. The outward facing image sensors 230 may be configured to capture individual images and/or sequences of images (for example, at a configurable frame rate or frames rates). The MR/VR device 130 may include an audio subsystem 260, which may include one or more microphones 262 arranged to detect sounds, such as verbal commands from a user of the MR/VR device 130 (which may provide user input via the user input subsystem 136), and/or one or more speaker(s) 264 arranged to output sounds to the user, such as verbal queries, responses, instructions, and/or information.

The MR/VR device 130 may include a motion sensor 250 arranged to measure and report motion of the MR/VR device 130 as motion data. In some implementations, the motion sensor 250 may include an inertial measurement unit (IMU) including accelerometers (such as a 3-axis accelerometer), gyroscopes (such as a 3-axis gyroscope), and/or magnetometers (such as a 3-axis magnetometer). The MR/VR device 130 may be configured to use this motion data to determine changes in position and/or orientation of the MR/VR device 130, and/or respective changes in position and/or orientation of objects in a scene relative to MR/VR device 130. The outward facing image sensor(s) 230, image sensor(s) 244, sensors included in the motion sensor 250, and microphone(s) 260, which are included in or are coupled to the head mounted MR/VR device 130, may be, individually or collectively, referred to as head mounted sensors. Data collected via such head mounted sensors reflect the pose of a user's head.

The MR/VR system 138 includes a controller 210 (which may be included, in whole or in part, in the MR/VR device 130) including a logic subsystem 212, a data holding subsystem 214, and a communications subsystem 216. The logic subsystem 212 may include, for example, one or more processors configured to execute instructions and communicate with the other elements of the MR/VR system 138 according to such instructions to realize various aspects of this disclosure. Such aspects include, but are not limited to, configuring and controlling devices, processing sensor input, communicating with and between computer systems, and/or displaying user views of virtual objects via the display subsystem 220. Examples of the processors include, but are not limited to, a central processing unit (CPU), a graphics processing unit (GPU), a digital signal processor (DSP), an ASIC, or suitable combinations thereof. The data holding subsystem 214 includes one or more memory devices (such as, but not limited to, DRAM devices) and/or one or more storage devices (such as, but not limited to, flash memory devices). The data holding subsystem 214 includes one or more machine readable media having instructions stored thereon which are executable by the logic subsystem 212 and which when executed by the logic subsystem 212 cause the logic subsystem 212 to realize various aspects of this disclosure. Such instructions may be included as part of an operating system, application programs, or other executable programs. The communications subsystem 216 is arranged to allow elements of the MR/VR system 138 to communicate with and between computer systems. Such communication may be performed via, for example, Wi-Fi, cellular data communications, and/or Bluetooth. As previously discussed, the MR/VR system 138 includes the user input subsystem 136, which includes and/or receives information from the 3D hand pose tracking subsystem 134. The user input subsystem 136 and/or the 3D hand pose tracking subsystem 134 may be implemented at least in part by the MR/VR device 130. Also as previously discussed, in some implementations the MR/VR system 138 includes one or more 3D hand pose tracking apparatuses 132, and a 3D hand pose tracking apparatus 132 may include one or more input sensors 282 that may be used to generate user input events in addition to detected changes in hand poses 190.

It will be appreciated that the MR/VR device 130 and the MR/VR system 138 are provided by way of example, and thus is not meant to be limiting. Therefore, it is to be understood that the MR/VR device 130 and/or the MR/VR system 138 may include additional and/or alternative sensors, cameras, microphones, input devices, output devices, etc. than those shown without departing from the scope of this disclosure. Also, the physical configuration of the MR/VR system 138 and its various elements may take a variety of different forms without departing from the scope of this disclosure. Further, various functions described herein and features of the MR/VR device 130 and/or the MR/VR system 138 (including processors included in logic subsystem 212, data holding subsystem 214, and instructions stored therein) can be divided and/or distributed among multiple devices and/or processing systems. For example, the MR/VR device 130 may be a simplified head mounted device including a display and head mounted sensors, but with much of the processing performed by an external device such as a handheld, notebook, or desktop computing device. FIGS. 2 and 3 illustrate examples of devices, methods, and/or processes for interacting with virtual environments via features provided by the MR/VR system 138 and software applications executing on the MR/VR system 138. The devices, methods, and/or processes illustrated in FIGS. 2 and 3 may be implemented using and/or in combination with the various devices, systems, elements, and features described herein.

FIG. 4 illustrates an example of the first handheld 3D hand pose tracking apparatus 132a ("right motion controller", "right input device," or "right controller") and the second handheld 3D hand pose tracking apparatus 132b ("left motion controller", "left input device," or "left controller") shown in FIGS. 1 and 3. An example of the handheld 3D hand pose tracking apparatuses 132 illustrated in FIGS. 1 and 4 is the Microsoft Mixed Reality Motion Controller commercially released by Microsoft Corporation of Redmond, Wash., US in 2017. The handheld 3D hand pose tracking apparatuses 132 are adapted to interact with other elements of the MR/VR system 138, such as the MR/VR device 130, and to provide information relating to the hand poses 190 for the hands 112 holding and manipulating the handheld 3D hand pose tracking apparatuses 132, portions of the hands 112, and/or the handheld 3D hand pose tracking apparatuses 132 and changes in the hand poses 190. FIG. 4 illustrates examples of devices, methods, and/or processes for interacting with virtual environments via hand pose tracking. The devices, methods, and/or processes illustrated in FIG. 4 may be implemented using and/or in combination with the various devices, systems, elements, and features described herein.

Noting that the second handheld 3D hand pose tracking apparatus 132b is similarly configured, the first handheld 3D hand pose tracking apparatus 132a includes a controller 284 including a logic subsystem, a data holding subsystem, and a communications subsystem. The logic subsystem may include, for example, one or more processors configured to execute instructions and communicate with other elements of the first handheld 3D hand pose tracking apparatus 132a and/or the MR/VR system 138 according to such instructions. Such aspects include, but are not limited to, processing sensor input and communicating with other computer systems. The data holding subsystem includes one or more memory devices and/or one or more storage devices, and includes one or more media having instructions stored thereon which are executable by the logic subsystem, which cause the logic subsystem to realize various aspects of this disclosure involving the first handheld 3D hand pose tracking apparatus 132a. Such instructions may be included as part of an operating system, firmware, or other executable programs. The communications subsystem is arranged to allow the first handheld 3D hand pose tracking apparatus 132a to communicate with other elements of the MR/VR system 138, such as other computing devices. Such communication may be performed via, for example, Wi-Fi and/or Bluetooth.

The first handheld 3D hand pose tracking apparatus 132a also includes a motion sensor 285 arranged to measure and report motion of the first handheld 3D hand pose tracking apparatus 132a as motion sensor data. In some implementations, the motion sensor 285 may include an inertial measurement unit (IMU) including accelerometers (such as a 3-axis accelerometer), gyroscopes (such as a 3-axis gyroscope), and/or magnetometers (such as a 3-axis magnetometer). The instructions executed by the logic subsystem cause the logic subsystem to receive the motion sensor data and transmit corresponding motion data via the communications subsystem to one or more other elements of the MR/VR system 138.

As previously noted, in some implementations the first handheld 3D hand pose tracking apparatus 132a includes one or more input sensors 282 arranged to detect motions of the digits of the right hand 112a. For example, FIG. 4 illustrates a capacitive touchpad 282 arranged to detect a position or area of contact of a thumb 291 of the right hand 112a. Other examples of input sensors include, but are not limited to, a thumbstick and buttons at various positions on the first handheld 3D hand pose tracking apparatus 132a, such as one or more buttons arranged for operation by the thumb 291, a trigger operated by index finger 292 of the right hand 112a, and one or more buttons on a handle 281 of the first handheld 3D hand pose tracking apparatus 132a operated by fingers positioned on or near the handle 281, such as a middle finger 293 of the right hand 112a. The instructions executed by the logic subsystem cause the logic subsystem to obtain information from the input sensors and transmit corresponding user input data via the communications subsystem to one or more other elements of the MR/VR system 138.

In some implementations, the first handheld 3D hand pose tracking apparatus 132a operates in combination with the MR/VR device 130 and/or other elements of the MR/VR system 138 to provide the 3D hand pose tracking system 134, much as discussed in FIG. 1. In the example shown in FIG. 4, plurality of optical tracking elements 283 are arranged on an exterior of the first handheld 3D hand pose tracking apparatus 132a. The MR/VR device 130 is configured to capture, via digital imaging camera(s) 232, images of the first handheld 3D hand pose tracking apparatus 132a, including a portion of the optical tracking elements 283 visible to the digital imaging camera(s) 232. Additionally, the MR/VR system 138 (for example, via the MR/VR device 130) is configured to communicate with the first handheld 3D hand pose tracking apparatus 132a to receive the motion sensor data generated by the first handheld 3D hand pose tracking apparatus 132a. In combination with other data provided by the MR/VR device 130 relating to changes in pose of the MR/VR device 130, the MR/VR system 138 is configured to perform "inside-out" tracking to determine changes in the hand pose 190a for the right hand 112a, based at least on positions of the optical tracking elements 283 in the captured images and the motion sensor data received from the first handheld 3D hand pose tracking apparatus 132a. The changes in the hand pose 190a may be in connection with current poses for the hand pose 190a and/or predicted future poses for the hand pose 190a (for example, based on recent motion of the first handheld 3D hand pose tracking apparatus 132a).

It will be appreciated that the first handheld 3D hand pose tracking apparatus 132a, and the described operation in combination with other elements of the MR/VR system 138 to provide the 3D hand pose tracking system 134, is provided by way of example, and thus is not meant to be limiting. Therefore, it is to be understood that the first handheld 3D hand pose tracking apparatus 132a may include additional and/or alternative sensors, input devices, output devices, etc. than those shown without departing from the scope of this disclosure. Further, the physical configuration of a handheld 3D hand pose tracking apparatus 132 and its various sensors and subcomponents may take a variety of different forms without departing from the scope of this disclosure.

Figure 5:
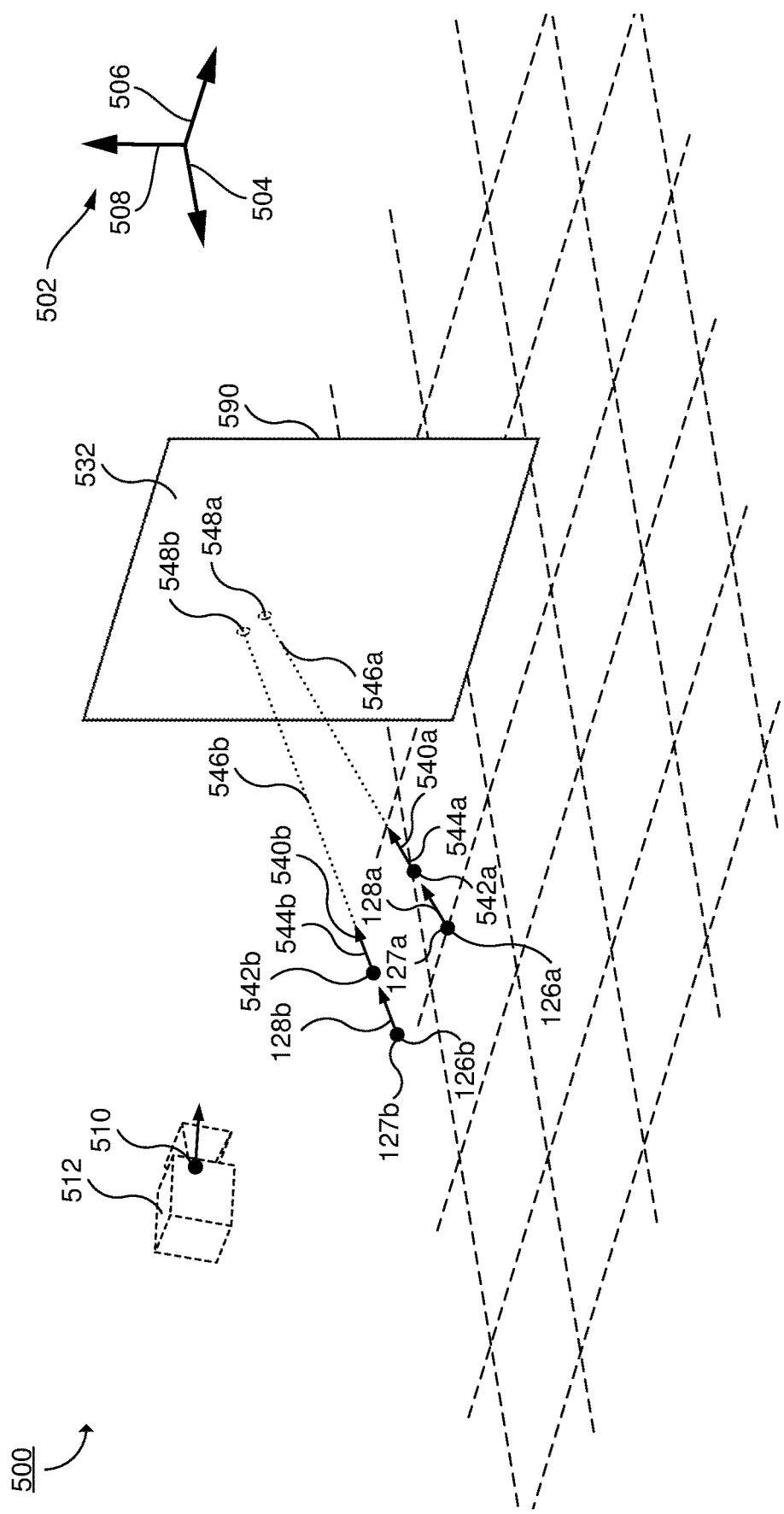
FIG. 5 illustrates a simplified example of a virtual environment that the user shown in FIG. 1 is interacting with via the MR/VR system shown in FIGS. 1 and 3.

FIG. 5 illustrates a simplified example of a second virtual environment 500 that the user 110 shown in FIG. 1 is interacting with via the MR/VR system 138 shown in FIGS. 1 and 3. Various examples of devices, methods, and/or processes for interacting with a virtual environment via an MR/VR system are described in connection with FIG. 5, and may be implemented using and/or in combination with the various devices, systems, elements, and features described herein. FIG. 5 illustrates a perspective view of the second virtual environment 500, rather than a user view. For purposes of clarity, FIG. 5 shows a second global space orientation 502 and respective three orthogonal axes, 504, 506, and 508, illustrating a coordinate system for the second virtual environment 500. It should be understood that the orientation of the axes 504, 506, and 508 in the second virtual environment 500 does not necessarily correspond to the axes of a physical space orientation.

FIG. 5 illustrates a virtual camera 512 positioned and oriented with a virtual camera pose 510 in the second virtual environment 500. The virtual camera pose 510 and virtual camera 512 define a viewpoint (and, in some examples, additional camera parameters, such as a field of view and/or aspect ratio) for rendering user views of elements of the second virtual environment 500 for display to the user 110 as rasterized frames. The virtual camera pose 510 in the second virtual environment 500 changes over time in correspondence with pose changes for the user 110 (for example, a pose of an HMD, the head of the user 110, and/or an eye of the user 110) in a second physical environment determined by the MR/VR system 138 (for example, as determined based on motion sensor data for a head-mounted MR/VR device 130). In some examples, the virtual camera pose 510 may be determined based in part on identification of features of the second physical environment around the MR/VR device 130. For example, by use of a depth camera or other sensors, a position and/or orientation determined for those features may be used to determine a vertical component of the virtual camera pose 510. The virtual camera pose 510 may also change in response to events other than movement of the head of the user 110, such as, but not limited to, a "teleport" or other virtual locomotion action to a new position in the second virtual environment 500 selected by the user 110. Although a single virtual camera 512 is illustrated in FIG. 5, for an MR/VR device having a stereoscopic display, an additional second virtual camera (not illustrated in FIG. 5) may be included positioned adjacent to the virtual camera 512, thereby providing a virtual camera for each of the two eyes of the user 110 from appropriate perspectives.

Much as with the first virtual environment 120, the second virtual environment 500 includes one or more virtual objects with respective poses (including a position and orientation) in the second virtual environment 500, including a second virtual object 590. Some of the virtual objects may be positioned and/or oriented in the second virtual environment 500 based on identification of corresponding features of the second physical environment around the MR/VR device 130. Such correspondence between features of the physical environment and virtual object pose is useful where the MR/VR device 130 has a see-through display and/or is an augmented reality device, as virtual objects appear to have positions in and may conform to features of the second physical environment. It is also useful for a VR device, as virtual object counterparts to features of the second physical environment may allow the user 110 to interact with features of the second physical environment despite being unable to directly view the physical environment. For example, it may facilitate user interactions with real-world objects. Various techniques described herein relate to allowing users to more effectively and confidently reorient virtual objects according to the orientations of selected virtual objects via simple and intuitive hand-controlled user inputs.

Each virtual object is instantiated by a corresponding computer program (including, for example, an application program, a system program, and/or an operating system). The pose, size, shape, and appearance of a virtual object may change over time. Additionally, virtual objects can be added or removed from the second virtual environment 500. In some examples, a virtual object, or portions thereof, can be designated as not visible, and accordingly not rendered for display in a user view. In some implementations, a first application used to interact with the second virtual environment 500 provides one or more interfaces for importing a virtual model created in a different second application to instantiate a virtual object, creating a new virtual object (for example, the first application may be, at least in part, a modeling application allowing creation of a complex virtual object), and/or modifying a mesh of a virtual object.

A virtual object may include one or more virtual surfaces, at respective positions and/or orientations. A virtual surface may more simply be referred to as a "surface." In FIG. 5, the second virtual object 590 includes a rectangular surface 532 parallel to the axes 506 and 508. Although a planar surface 532 is illustrated in FIG. 5, a virtual surface does not have to be planar. For example, a virtual surface may be curved. Additionally, a single virtual surface may have multiple planar faces with different normal unit vectors. Also, a virtual surface may have a more complex shape. A virtual surface of a virtual object, a portion of the virtual surface, or the virtual object as a whole may provide an affordance allowing interaction with, and user input to, the application instantiating the virtual object (which may result in, among other things, changes in the appearance of the virtual object). A virtual surface providing an affordance may be referred to as an "interactive" surface. A virtual object providing an affordance may be referred to as an "interactive" virtual object. Examples of such affordances include, but are not limited to, buttons, checkboxes, radio buttons, toggles, text fields, pickers (allowing selection of, for example, a list item or a date), tabs, sliders, dials, and carousels. A single virtual surface may include multiple visual elements, including those associated with affordances. For example, a virtual surface may provide a UI that displays images and/or text and includes affordances for interaction with an application. Affordances may be dynamically added, removed, enabled, or disabled. Also, the number, content, and appearance of visual elements included in a virtual surface may change over time.

FIG. 5 also illustrates the first hand motion input source pose 126a, with the position 127a and orientation 128a, which changes in response to changes in the first hand pose 190a determined by the 3D hand pose tracking system 134 for the right hand 112a of the user 110. The position of the first hand motion input source pose 126a may correspond to a position of a real-world object being tracked by the 3D hand pose tracking system 134, as previously described in connection FIGS. 1-4. As previously described, and shown in various examples provided herein (including in FIG. 5), there may be multiple concurrent hand motion input source poses 126 associated with a single user. FIG. 5 also illustrates the second hand motion input source pose 126b, with a position 127b and orientation 128b, which changes in response to changes in the second hand pose 190b determined by the 3D hand pose tracking system 134. In this example, the second hand motion input source pose 126b is responsive to motion of the left hand 112b of the user 110. In some implementations, various techniques described herein may be implemented with only one hand motion input source pose 126. By way of example, some examples of user input described as involving using different hand motion input sources 126 may instead be performed using one hand motion input source 126.

Interactions with the second virtual environment 500 may be performed, at least in part, via the hand motion input source poses 126, allowing hands 112 to serve as virtual end effectors within the second virtual environment 500. FIG. 5 illustrates a first virtual input pose 540a, with a position 542a and orientation 544a, obtained based on the first hand motion input source pose 126a. In some examples, the position 542a is obtained based on, but is different than, the position 127a (in FIG. 5, the positions 127a and 542a are different), and/or the orientation 544a is obtained based on, but is different than, the direction 128a. FIG. 5 also shows a first virtual input ray 546a (which may also be referred to as a "virtual ray," a "virtual input source ray," an "input source projection," or an "input source pose projection") extending from the first virtual input pose 540a and intersecting the virtual surface 532 of the second virtual object 590 at the illustrated first virtual intersection 548a. In this example, neither the first virtual input line 546a nor the first virtual intersection 548a are rendered for display, although in some examples one or both of them may be rendered (for example, as shown in FIG. 1 in connection with the first object selection ray 180). In some examples, the first virtual intersection 546a defines a point of interaction between the first hand motion input source pose 126a and the intersecting virtual surface or virtual object (in this example, the virtual surface 532 and/or the virtual object 590). FIG. 5 also similarly shows the second hand motion input source pose 126b, with position 127b and orientation 128b, and a respective second virtual input pose 540b, with a position 542b and orientation 544b, for a corresponding second virtual input ray 546b intersecting the virtual surface 532 of the second virtual object 590 at the illustrated second virtual intersection 548b.

Figure 6:
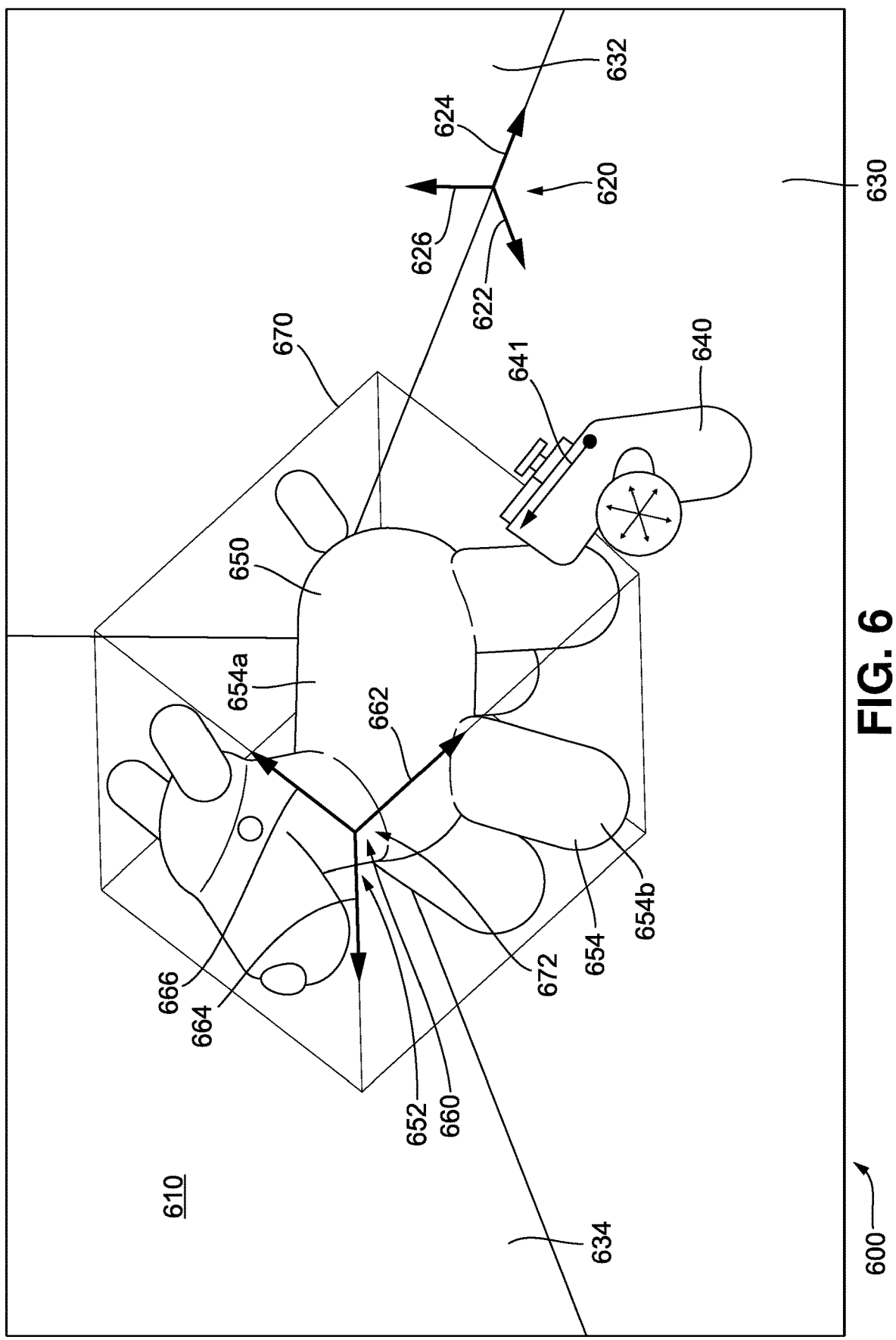
FIG. 6 depicts a user view including a virtual object.

With such context in mind, an implementation of the proposed techniques is now introduced with reference to FIG. 6, which may be implemented using and/or in combination with the various devices, systems, elements, and features described herein (such as, but not limited to, the examples described in connection with FIGS. 1-5). In FIG. 6, a second user view 600 (at a third time) of a third virtual environment 610 is depicted. To provide a better understanding of the perspectives shown in various figures, the third virtual environment 610 includes three planar surfaces (or, more simply, "surfaces") of one or more virtual objects, including a first planar surface 630, a second planar surface 632, and a third planar surface 634. The planar surfaces 630, 632, and 634 extend in different directions in the third virtual environment 610, and are positioned and oriented around a third virtual object 650 (for example, instantiated from a first model), which simply for the purposes of example appears in the shape of a dog. In addition, the third virtual environment 610 has a third global space orientation 620 with a horizontal axis 624, a lateral axis 622, and a vertical axis 626. For purposes of clarity of the reader, the third global space orientation 620 is shown in FIG. 6, but it should be understood that this set of axes is not rendered for display to a user. In this example, the third planar surface 630 extends in a direction that is parallel to lateral axis 622 and horizontal axis 624, the second planar surface 632 extends in a direction that is parallel to horizontal axis 624 and vertical axis 626, and the third planar surface 634 extends in a direction that is parallel to lateral axis 622 and vertical axis 626. Thus, each planar surface is orthogonal with respect to the other two planar surfaces.

As noted above, the third virtual environment 610 further includes the third virtual object 650, which in this example is a complex virtual object comprising a group of a plurality of component virtual objects 654, including a first component object 654a (corresponding here to a 'body' region of the dog-shaped third virtual object 650) and a second component object 654b (corresponding here to a 'foreleg' region of the dog-shaped third virtual object 650). In this example, the larger complex third virtual object 650 can also be referred to as a parent virtual object for a group of child composite virtual objects that are assembled or congregate to form the larger complex third virtual object 650. Each virtual object, including a complex virtual object or a component virtual object, in the virtual environment 610 has a respective object space orientation. In this case, the third virtual object 650 has a second object space orientation 652 (which may also be referred to as the orientation of the third virtual object 650), including a first axis 662, a second axis 664, and a third axis 666 that are orthogonal relative to one another. For purposes of clarity of the reader, the second object space orientation 652 is shown and identified in the drawings, but it should be understood that this set of axes is not rendered for display to the user. Furthermore, the second object space orientation 652 can change over time, as will be shown in later figures. At the third time shown in FIG. 6, the second object space orientation 652 has a third orientation 660 (which may be with respect to the third global space orientation 620). In addition, at the third time the second object space orientation 652 (having the third orientation 660 in FIG. 6) is different than the third global space orientation 620. In the various examples provided herein, a rotation performed on the third object 650 will result in the same rotation being applied to the second object space orientation 652, thereby changing the second object space orientation 652 from the third orientation 660 to a different orientation (see FIG. 7) while the component virtual objects 654 maintain their poses relative to the rotated second object space orientation 652.

For the user, awareness and control of an object space orientation of a virtual object can be of great use in the user's understanding of a virtual environment, the user's ability to interact with and manipulate virtual objects, and (as will be discussed below) changing the object space orientations of such virtual objects to other desired poses. In different implementations, an MR/VR system can be configured to also display to the user a second bounding box 670 corresponding to or associated with the third virtual object 650. Thus, the second bounding box 670 is not in of itself a virtual object but instead a reference tool or element displayed for the third virtual object 650 for the benefit of the user. In this example, the second bounding box 670 of the third virtual object 650 indicates and is aligned according to the second object space orientation 652 of the third virtual object 650, and so the second bounding box 670 at the third time has a second bounding box orientation 672 the same as the second object space orientation 652 (which is the third orientation 660 in FIG. 6). For purposes of discussion the bounding boxes shown in this and later figures is in the form of a three-dimensional rectangular box wrapped as tightly as possible around its associated virtual object or selection, although other implementations may be used. A 3D rectangular bounding box for a virtual object can, as shown in the drawings, have sides parallel to the axes of the object space orientation for the virtual object. However, in other implementations, a bounding box can be any substantially enclosed shape whose volume substantially or fully 'contains' the mesh of the associated virtual object. For convenience of illustration, second object space orientation 652 as depicted for the reader is shown positioned on a corner of the second bounding box 670 in FIG. 6, reflecting the alignment of the second bounding box 670 with the second object space orientation 652. In FIG. 6, the third virtual environment 610 also includes a third controller avatar 640 having a third controller pose 641 and associated with the user's right hand, as previously described for the first hand input virtual object 124a in FIG. 1, for interacting with and manipulating virtual objects in the third virtual environment 610, as discussed above. The third controller pose 641 (and other such controller poses) can change as a user submits inputs to the MR/VR system.

Figure 7:
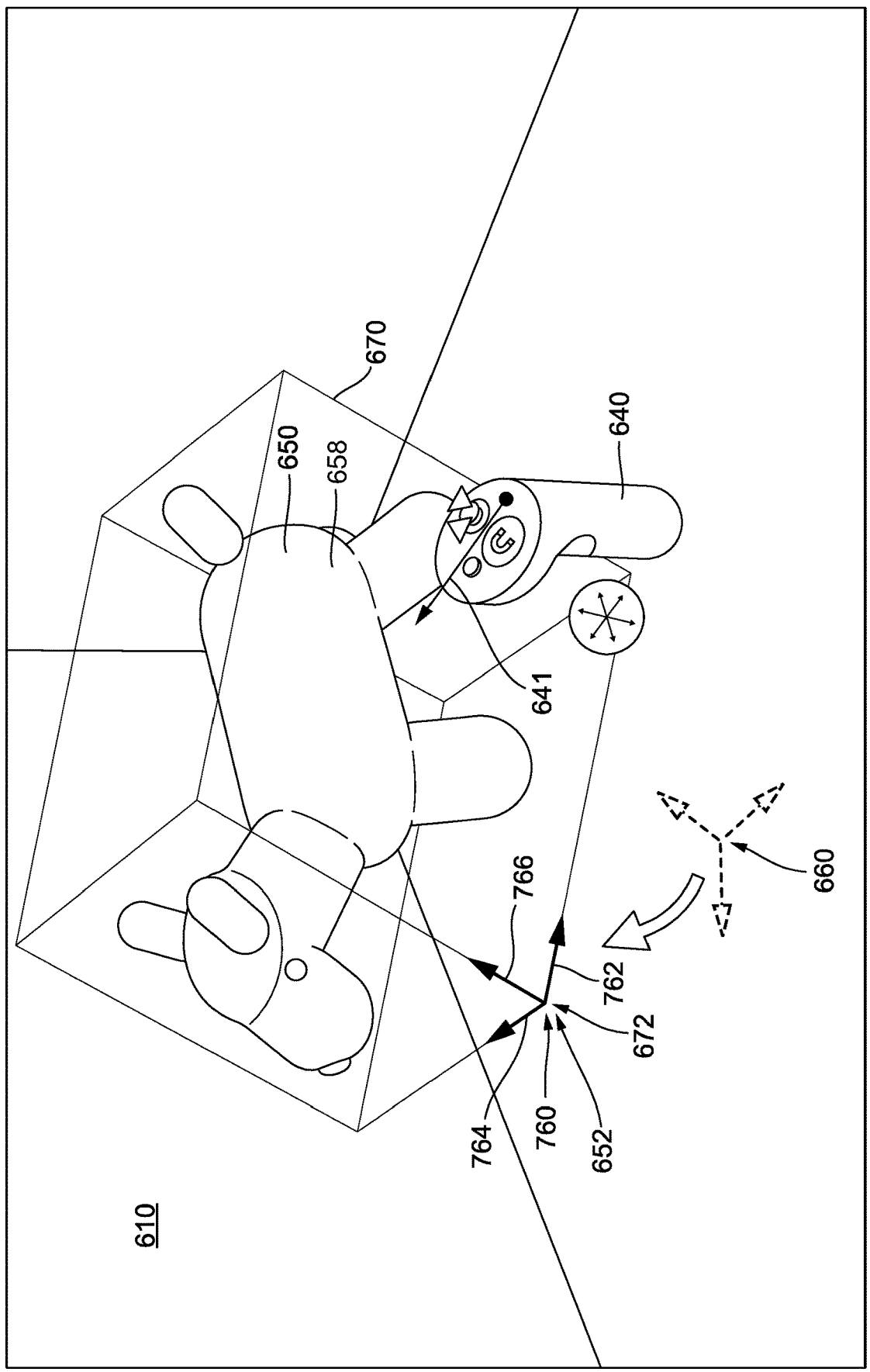
FIG. 7 shows a user view in which the virtual object of FIG. 6 has been rotated.
Figure 8:
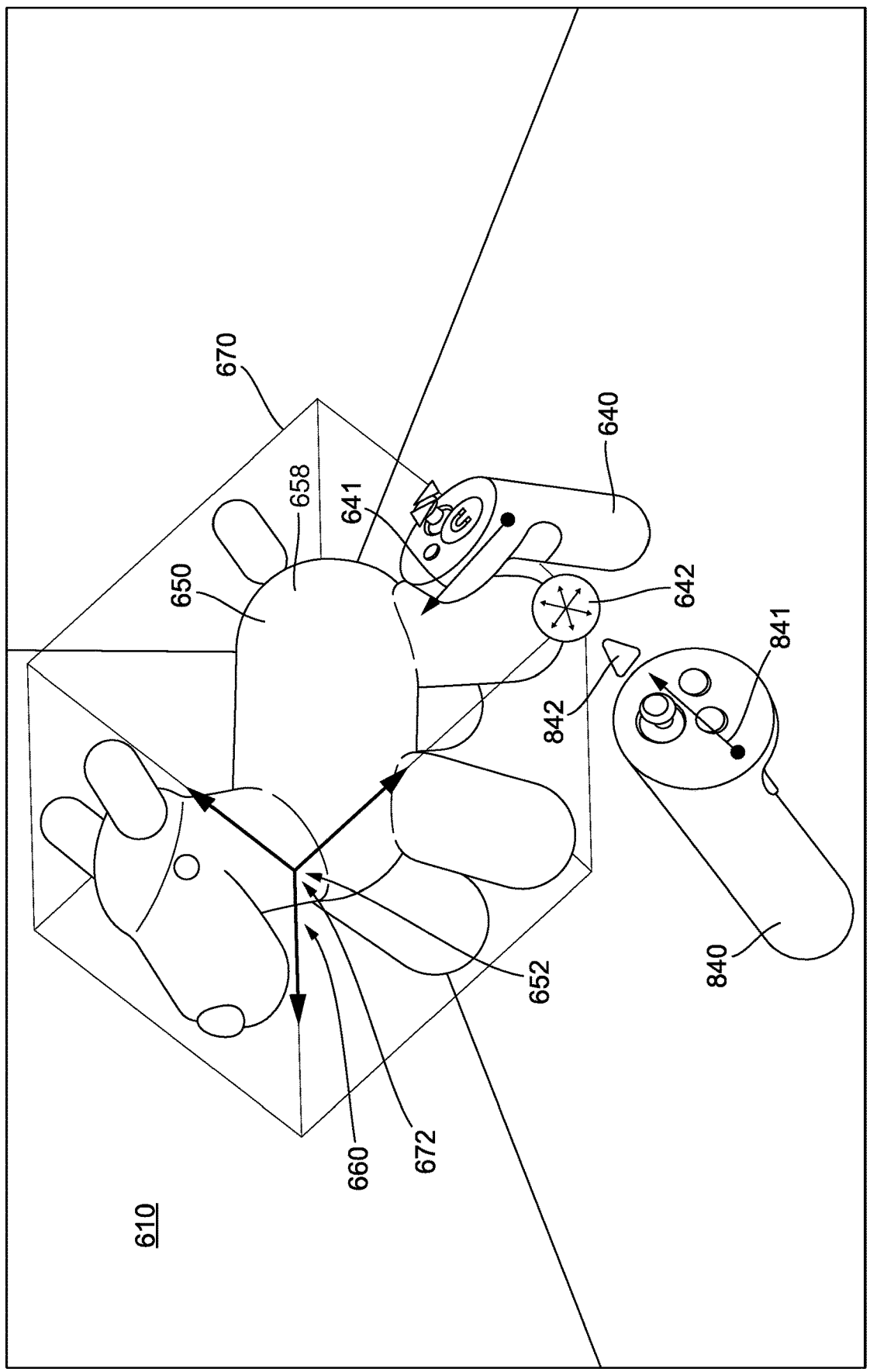
FIG. 8 shows a user view in which an object reorientation mode is about to be activated.

Continuing the example shown in FIG. 6, FIG. 7 shows a third user view 700, at a fourth time after the third time shown in FIG. 6, of the third virtual environment 610. In response to a change in the first controller pose 641 of the third controller avatar 640 (while the third virtual object 650 was selected as a currently selected virtual object 658), the third virtual object 650 is it can be seen that the second object space orientation 652 of the third virtual object 650 has also changed from the third orientation 660 of FIG. 1 to a different fourth orientation 760. It can be understood that in this example, the change in the second object space orientation 652 reflects the change in first controller pose 641 resulting from the user's input. The fourth orientation 760 has a first axis 762, a second axis 764, and a third axis 766 that are orthogonal to one another. It is noted that although the second object space orientation 652 has changed with respect to the third global space orientation 620, orientations of the component virtual objects 654 remain unchanged with respect to the second object space orientation 652.

Furthermore, the second bounding box orientation 672 of the second bounding box 670, being currently anchored or coupled to the orientation of the third virtual object 650, has likewise changed to the fourth orientation 760. Although a user may rotate a virtual object in such a manner, it can be observed that such rotation is somewhat unwieldy and unintuitive. For example, in order to move the dog-shaped third virtual object 650 so that a 'nose' or 'snout' region faces toward the third planar surface 630 (in this case, the 'ground') the user must engage in non-trivial adjustments of the dog-shaped third virtual object 650 as the second object space orientation 652 remains disconnected from the larger landscape. In other words, the user may wish to make adjustments to move a virtual object in the context of the background (or other foreground objects not shown), yet be hindered by the challenge of aligning various orientation axes between such virtual objects.

Referring to the sequence presented in FIGS. 8-12, some of the techniques for improving such interactions are described. Continuing the example shown in FIG. 6, in FIG. 8, a fourth user view 800 (at a fifth time after the third time shown in FIG. 6) of the third virtual environment 610 is shown. At this stage, the second object space orientation 652 of the third virtual object 650 and the second bounding box orientation 672 for the corresponding second bounding box 670 both remain aligned with the third orientation 660 shown in FIG. 6. The fourth user view 800 now includes both the third controller avatar 640 operated by the right hand of the user, as well as a fourth controller avatar 840 operated by a left hand of the user. The fourth controller avatar 840 has a fourth controller pose 841 that in this case differs from the third controller pose 641. The user may make use of or apply one of a range of tools to a currently selected virtual object. The MR/VR system may display the fourth controller avatar 840 with a tool selector pointer 842 that can be used to help the user navigate and identify the desired tool(s). In this example, the user, having selected the third virtual object 650 as the currently selected virtual object 658, now provides user navigation inputs via movement of the fourth controller avatar 840. Because the tool selector pointer 842 is a visual extension of the fourth controller avatar 840, the tool selector pointer 842 is moved as the fourth controller avatar 840 is moved and can be directed to point at different elements in the third virtual environment 610.

Thus, with the aid of the visual reference provided by tool selector pointer 842, user navigation continues, moving the fourth controller avatar 840 until the tool selector pointer 842 is directed to an object reorientation tool element 642 currently displayed adjacent to the third controller avatar 640. The object reorientation tool element 642 is shown to represent a mode, tool, or feature that can be activated for use with a currently selected virtual object. A user command input received while the user directs the fourth controller avatar 840 to the orientation tool element 642 can activate or engage the tool(s) associated with the object reorientation tool element 642. In other implementations, however, the second object reorientation mode and/or features or tools can be engaged or selected prior to the selection of the currently selected virtual object 658, such that those features or tools can then be applied to the subsequently selected currently selected virtual object 658.

Figure 9:
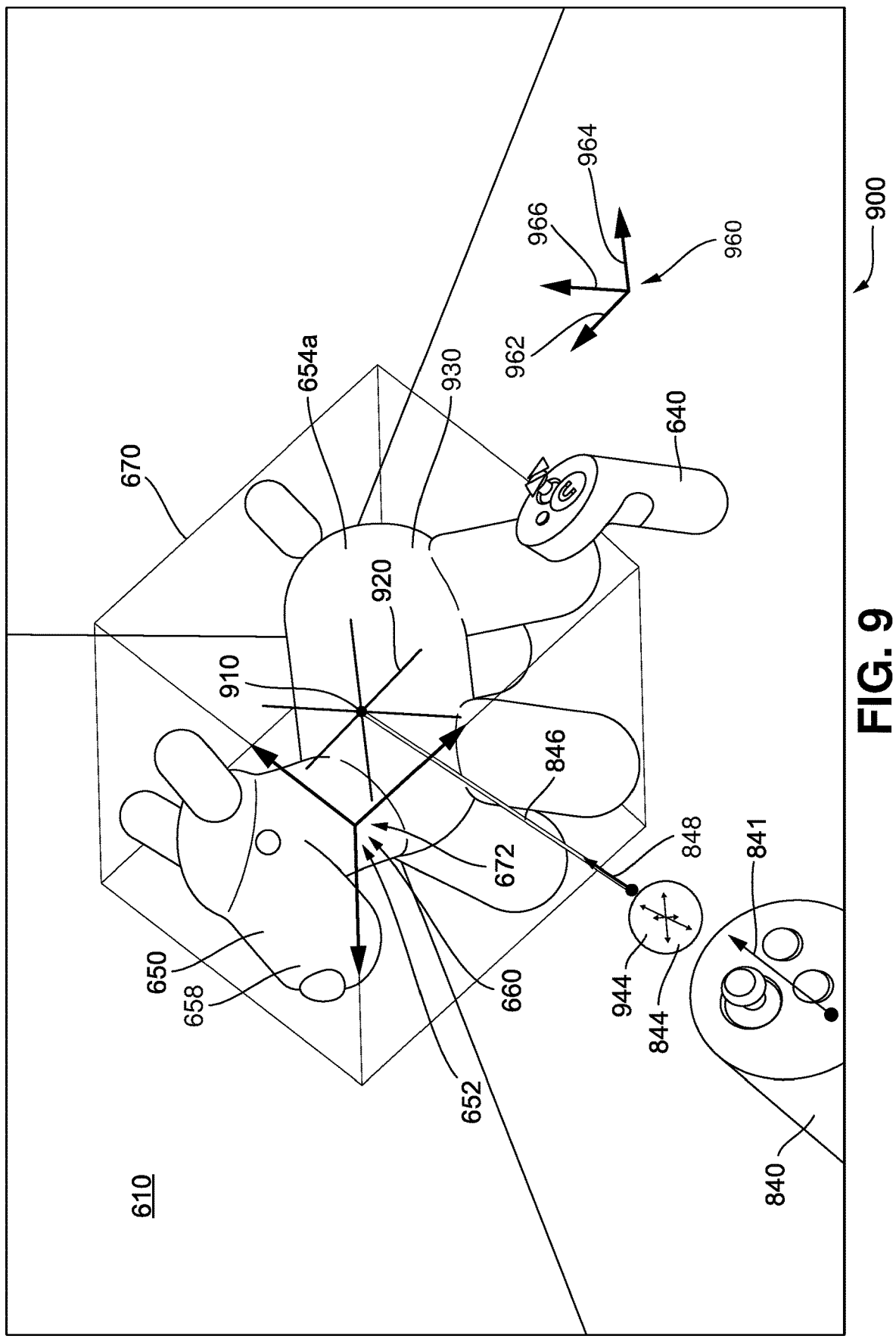
FIG. 9 shows a user view in which the object reorientation mode is active and an object selection ray intersects a component virtual object of the virtual object of FIG. 6, selecting it as a reference virtual object.

In FIG. 9, a fifth user view 900 (at a sixth time after the fifth time shown in FIG. 8) of the third virtual environment 610 is shown. In response to the user command input that occurred in the context of FIG. 8, the MR/VR system activates (or "enters") a second object reorientation mode in which, for example, changes in orientation of the second bounding box 670 can be triggered. In FIG. 9, while the second object reorientation mode remains active, the MR/VR system displays an object reorientation tool element 844 (visually indicating to the user that the second object reorientation mode is active) and a user-directed second object selection ray 846 (which may be referred to as a "beam") to the user. In this example, the second object selection ray 846 extends or emanates from the object reorientation tool element 844 that is displayed in conjunction with the fourth controller avatar 840 and has a second object selection pose 848 corresponding to or aligned with the second controller pose 841. The two poses 841 and 848 are coupled or locked together. Thus, user navigation input that changes the fourth controller pose 841 also changes the second object selection pose 848 of the second object selection ray 846. As the second object selection ray 846 is moved in the third virtual environment 610, it may intersect with various surfaces associated with virtual objects in the third virtual environment 610, such as virtual objects (including virtual objects for the planar surfaces 630, 632, and 634). In FIG. 9, the second object selection ray 846 is shown extending in a direction toward and contacting the first component object 654a of the complex third virtual object 650 at a first intersection point 910. In FIG. 9, the object reorientation tool element 844 has a first visual appearance 944.

Based on a determination that the second object selection ray 846 is pointed at the first component object 654a, the first component object 654a is selected as a second reference virtual object 930. Based on the determination that the second object selection ray 846 is pointed at the first component object 654a and/or the selection of the first component object 654a as the second reference virtual object 930, a second reference object orientation indicator 920, visually indicating a fifth orientation 960, with axes 962, 964, and 966, for the first component object 654a, is also displayed to the user in response to this user input. In some implementations, a reference object orientation indicator is a visual indication representing an orientation of a specific virtual object (in this example, the first component object 654a) currently targeted by an object selection ray. In FIG. 9, the fifth orientation 960 differs from the third orientation 660 of the second object space orientation 652 for the third virtual object 650 and the second bounding box orientation 672 for the corresponding second bounding box 670. Thus, it can be observed that one or more component virtual objects of a complex virtual object can each have a respective object space orientation ("component object space orientation") that differs from the object space orientation ("complex object space orientation") of the complex virtual object. Furthermore, respective component object space orientations of the various component virtual objects can also differ from one another.

As will be discussed with respect to FIG. 10, each component virtual object 654 can offer the user a 'shortcut' or quick-switch option to alter the complex object space orientation 652 such that it aligns with an orientation associated with a selected component virtual object 654, or even to match orientations of virtual objects that are outside of the complex third virtual object 650. In this case, the user submits a user command input request via the object reorientation tool element 844 that the second object space orientation 652 (currently aligned with third orientation 660) be changed to match the fifth orientation 920 of the first component object 654a.

Figure 10:
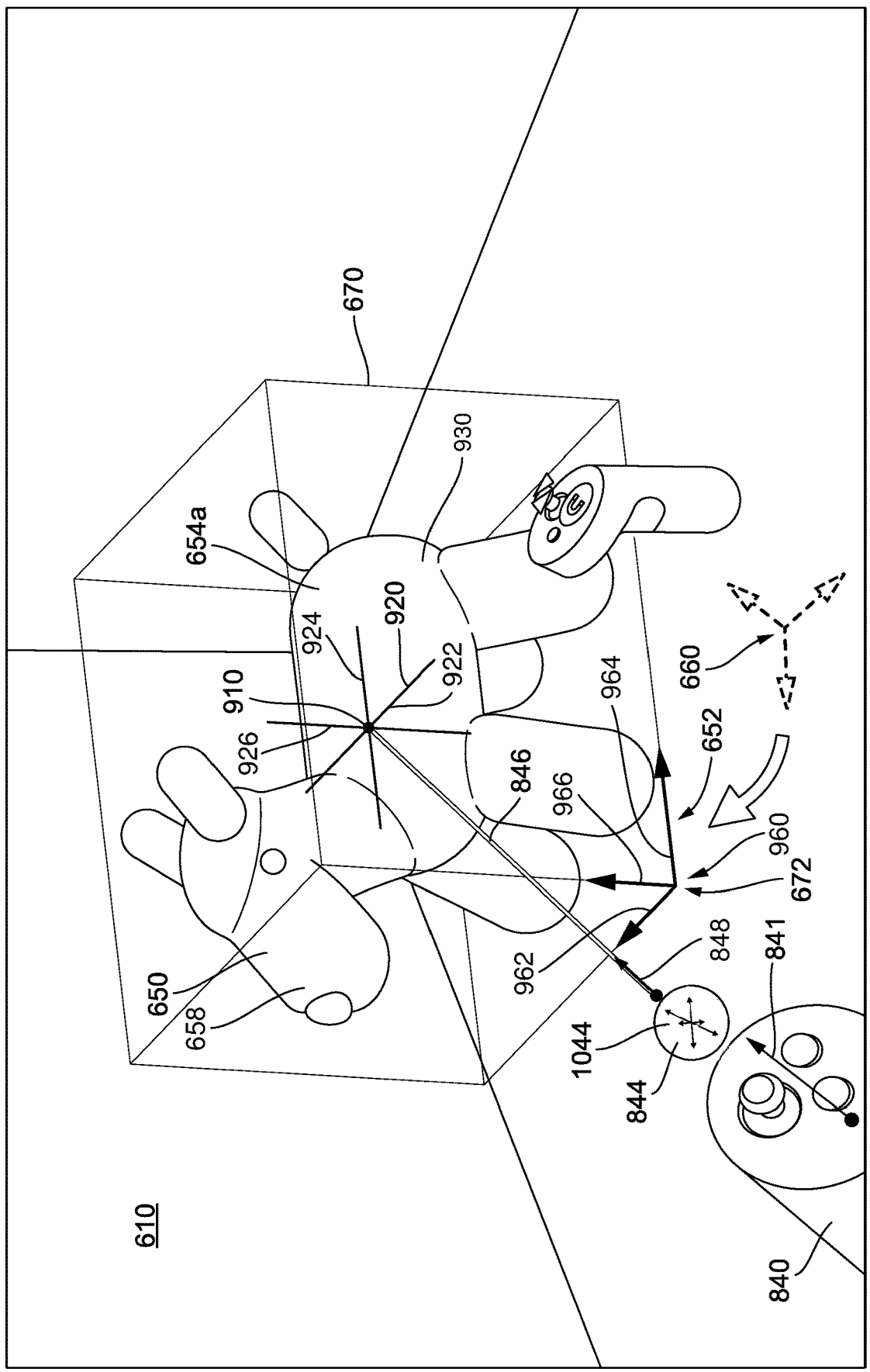
FIG. 10 shows an object space orientation of the virtual object of FIG. 6 having been reoriented to match an orientation of the reference virtual object selected in FIG. 9.

A sixth user view 1000 (at a seventh time after the sixth time shown in FIG. 9) of the third virtual environment 610 is shown in FIG. 10. The sixth user view 1000 occurs after the user command input described in FIG. 9. As in FIG. 9, shows the second reference object orientation indicator 920 as three axes 922, 924, and 926, which are parallel to respective axes 962, 964, and 966 of the fifth orientation 960. In FIG. 10, the object reorientation tool element 844 associated with the fourth controller avatar 840 temporarily changes from the first visual appearance 944 shown in FIG. 9 to a different second visual appearance 1044 in response to the user actuation (e.g., by a change in color, brightness, size, shape, or other brief visual transitional indication), to provide visual feedback to the user that the request was received and the corresponding action or task is being performed and/or has just been performed. In response to the user command input, the MR/VR system is configured to reorient the third virtual object 650 such that the resultant second object space orientation 652 for the third virtual object 650 has the same fifth orientation 960 of the second reference virtual object 930. In other words, the second object space orientation 652 for the third virtual object 650 has now changed from the third orientation 660 (shown for purposes of comparison for the reader here in FIG. 10) to the fifth orientation 960 of the first component object 654a. The second bounding box 670 is also reoriented to reflect this change, such that the second bounding box orientation 672 is also now aligned with the fifth orientation 960. Such a 'snap-fit' reorientation can allow users to quickly and easily rotate an orientation of a virtual object in a way that improves coordination between different aspects of the virtual environment in which they are interacting. It is noted that the reorientation of the third virtual object 650 in FIG. 10 differs from the rotation shown in FIG. 7, as the reorientation in FIG. 10 changes an orientation of the object coordinate system for the third virtual object 650 relative to the third global space orientation 620, but without a corresponding change in the orientation of the third virtual object 650 and/or the component virtual objects 654 relative to the third global space orientation 620.

Figure 11:
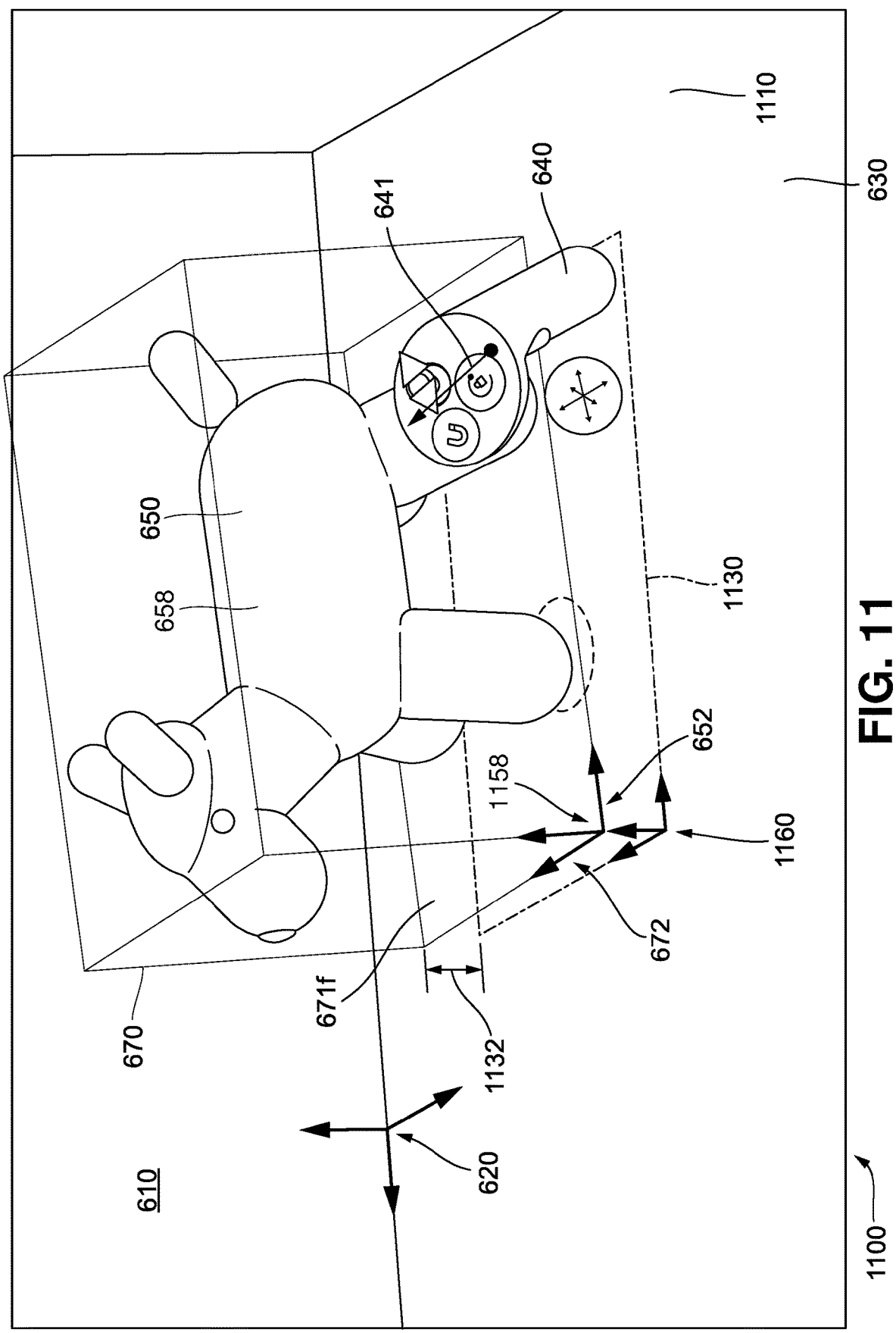
FIG. 11 shows movement of the reoriented virtual object from FIG. 10 to a position that will actuate a snap-contact mechanism for aligning the virtual object with a surface of another virtual object.

In some implementations, the MR/VR system can also offer tools for aligning a virtual object with surfaces of other virtual objects. In a seventh user view 1100 (at an eighth time after the seventh time shown in FIG. 10) of the third virtual environment 610 shown in FIG. 11, the second object space orientation 652 of the third virtual object 650, as well as the second bounding box orientation 672 of the second bounding box 670, has been changed to a sixth orientation 1158 (for example, by moving the third virtual object 650 much as shown in FIG. 7). In FIG. 11, in response to user navigation inputs, here received via in connection with the third controller avatar 640 and the third controller pose 641, the third virtual object 650 is brought into closer proximity with the third surface 630 (which is a surface of a fourth virtual object 1110), and also rotated in accordance with the changes in first controller pose 641 (thereby changing the second object space orientation 652 and the second bounding box orientation 672). As various portions of the third virtual object 650 and/or the second bounding box 670 approach to the third surface 630, for example from a first position in FIG. 10 to a second position in FIG. 11, the MR/VR system can be configured to determine when the third virtual object 650 is within a minimum distance relative to the third surface 630 and provide an opportunity to the user to activate a snap-contact mechanism ("snapping feature") between the currently selected object 658 and the proximate third surface 630. In this example, once the third virtual object 650 reaches or passes a model snapping threshold distance 1132 (shown with respect to an outline 1130 drawn on the third surface 630 for purposes of clarity of the reader), the third virtual object 650 can be 'snapped' or locked to the third surface 630 (e.g., see magnet icon currently displayed to the user as a tool option for use with the third controller avatar 640). In other words, in response to the third virtual object 650 being moved to within the model snapping threshold distance 1132, the second object space orientation 652, as well as the second bounding box orientation 672, are snapped into an alignment that is parallel to the third planar surface 630 and with a lower surface 671f of the second bounding box 670 in contact with the third surface 630 (as illustrated by the outline 1130). As a result, the third virtual object 650 is rotated from the sixth orientation 1158 to a seventh orientation 1160 of the third surface 630.

Figure 12:
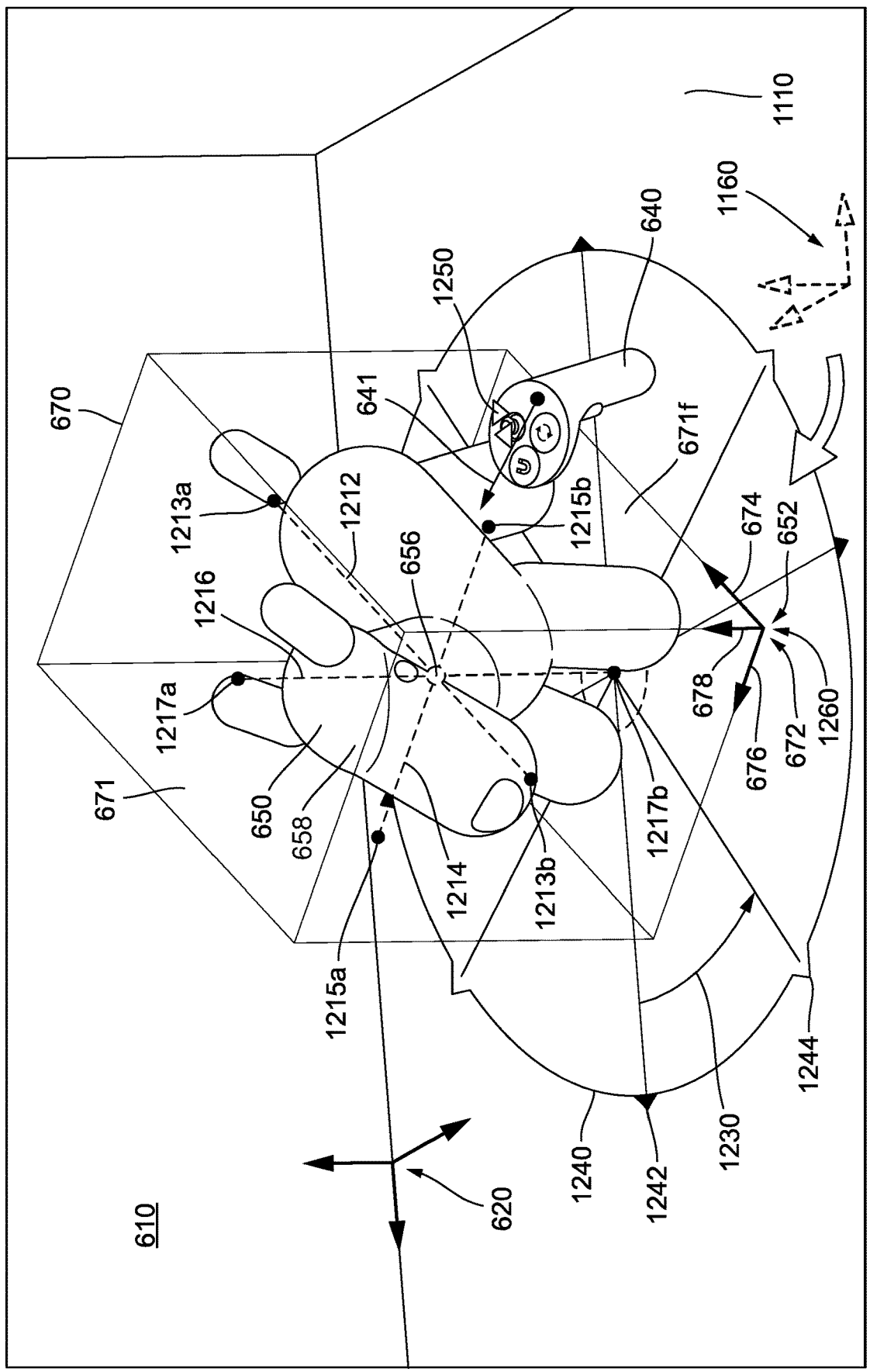
FIG. 12 shows the reoriented virtual object of FIGS. 10 and 11 after having been aligned by the snap-contact mechanism and subsequently rotated.

Furthermore, FIG. 12 shows in an eighth user view 1200 of the third virtual environment 610, representing a transition of the third virtual object 650 between the eighth time shown in FIG. 11 and a ninth time after the eighth time. In response to the actuation of the snapping feature in FIG. 11, the third virtual object 650 has been moved directly down and rotated into contact with the third surface 630, and all surfaces 671 of the second bounding box 670 have moved in accordance with that shift, such that the lower surface 671f of the second bounding box 670 is 'resting', disposed, or contacting against the surface of the third surface 630, and is now coplanar with the third planar surface 630. In some cases, this may appear similar to a magnetic attraction of the third virtual object 650 to the third surface 630 of the fourth virtual object 1110, causing the third virtual object 650 to contact the fourth virtual object 1110. The reader may also observe a dashed circle that is depicted directly beneath the third virtual object 650 (also positioned on the third surface 630). The dashed circle in this case represents an extension onto the third surface 630 of a current pivot point 656 for the third virtual object 650. For purposes of reference, the current pivot point 656 is associated with a set of pivot axes, including a first pivot axis 1212, a second pivot axis 1214, and a third pivot axis 1216. Each axis is shown extending between two intersection points of two opposite facing surfaces of the second bounding box 670 (with the pivot point 656 at the center). In FIG. 12, the first pivot axis 1212 extends between a first box intersection 1213a and a second box intersection 1213b, the second pivot axis 1214 extends between a third box intersection 1215a and a fourth box intersection 1215b, and the third pivot axis 1216 extends between a fifth box intersection 1217a and a sixth box intersection 1217b (also corresponding to the center of the dashed circle).

In response to a user command input, a user can actuate a rotational tool that allows the user to rotate the third virtual object 650 within the snapped relationship between the third virtual object 650 and third surface 630 resulting from the process of FIG. 11. A rotational indicator 1240 is also displayed on the third surface 630 for the benefit of the user. In response to a user navigation input, here received via a rotational tool 1250 associated with the third controller avatar 640, the third virtual object 650 is shown as it is rotated in a counterclockwise direction from a first rotational position (where the forward-facing surface of the second bounding box 670 nearest to the 'nose' of the dog-shaped third virtual object 650 was facing a first direction 1242) to a second rotational position where the forward-facing surface of the second bounding box 670 is now facing a second direction 1244, corresponding to an angular change 1230. The rotation occurs in response to the user input; as the user changes the first controller pose 641, the entire third virtual object 650 is rotated around its pivot point 656 in accordance with the change in pose. This movement has changed the second object space orientation 652 and the second bounding box orientation 672 from the seventh orientation 1160 in FIG. 11 to an eighth orientation 1260 that differs along two axes from one another (i.e., a first axis 678 remains aligned with a vertical axis, while a second axis 674 and a third axis 676 have been reoriented as shown in FIG. 12). Similarly, the axes emanating from the pivot point 656 rotate in a corresponding manner, such that first pivot axis 1212 is parallel to first axis 674, second pivot axis 1214 is parallel to a second axis 676, and third pivot axis 1216 (the axis around which rotation has occurred in this example) is parallel to a third axis 678. Thus, the alignment of the third virtual object 650 with the third surface 630 has permitted a more natural rotation of the third virtual object 650 relative to that third surface 630 and the third virtual environment 610.

Figure 13:
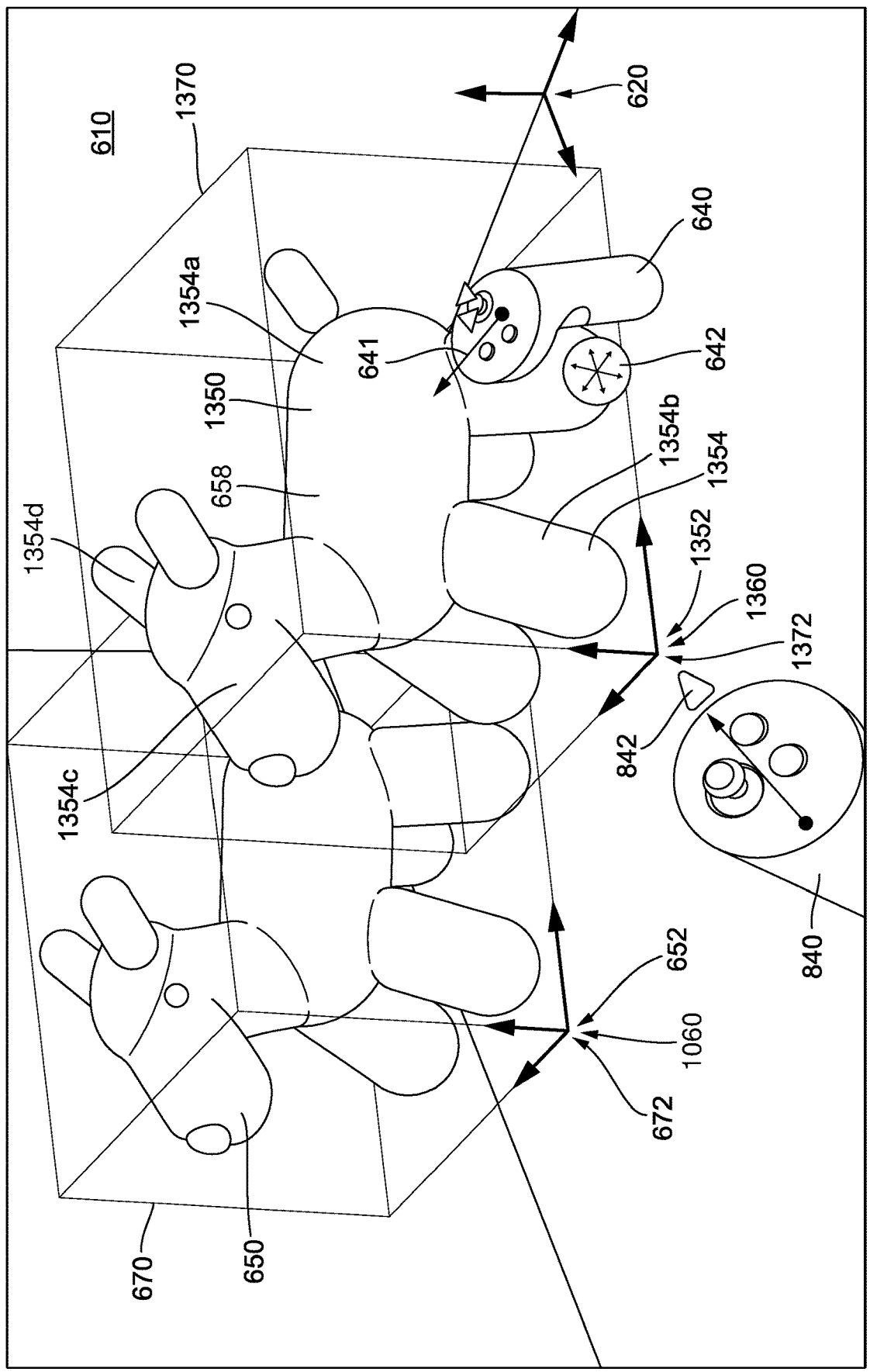
FIG. 13 shows a user view in which a new virtual object has been cloned or copied from the virtual object shown in FIG. 10.

In different implementations, the MR/VR systems described herein can include other provisions for facilitating a user's ability to reorient virtual objects. Referring now to FIG. 13, as an example, a ninth user view 1300 of the third virtual environment 610 (at a tenth time after the third time shown in FIG. 6) is shown in which a user has made a clone or identical copy (a fifth virtual object ("fifth object") 1350) of the third virtual object 650 via user input received in association with the third controller avatar 640. The fifth virtual object 1350 is also shown within its own third bounding box 1370 having a third bounding box orientation 1372. In addition, the fifth virtual object 1350 is a complex virtual object including its own set of component virtual objects 1354, such as a third component object 1354a (here, a 'body' of the dog-shaped fifth virtual object 1350), a fourth component object 1354*b* (a 'foreleg' of the of the dog-shaped fifth virtual object 1350), a fifth component object 1354*c* (a 'head' or 'snout' of the of the dog-shaped fifth virtual object 1350), and a sixth component object 1354*d* (a 'right ear' of the of the dog-shaped fifth virtual object 1350). As described earlier, each child object 1354 is associated with its own orientation (for example, a component object space orientation), which can differ from a third object space orientation 1352 of the fifth virtual object 1350. This can be used to quickly reorient the fifth virtual object 1350, as will be shown in FIG. 14. In FIG. 13, the second object space orientation 652 of the third virtual object 650 and the third object space orientation 1352 of the fifth virtual object 1350 are identical, such that the fifth orientation 960 of the second object space orientation 652 is the same as a ninth orientation 1360 of the third object space orientation 1352. The bounding box orientations 672 and 1372 are also the same and align with the object space orientations 652 and 1352. In some implementations, the two virtual objects 650 and 1350 may be engaged or locked, such that edits to one of the two virtual objects 650 or 1350 will also cause the same edits to the other virtual object ("linked virtual objects").

Figure 14:
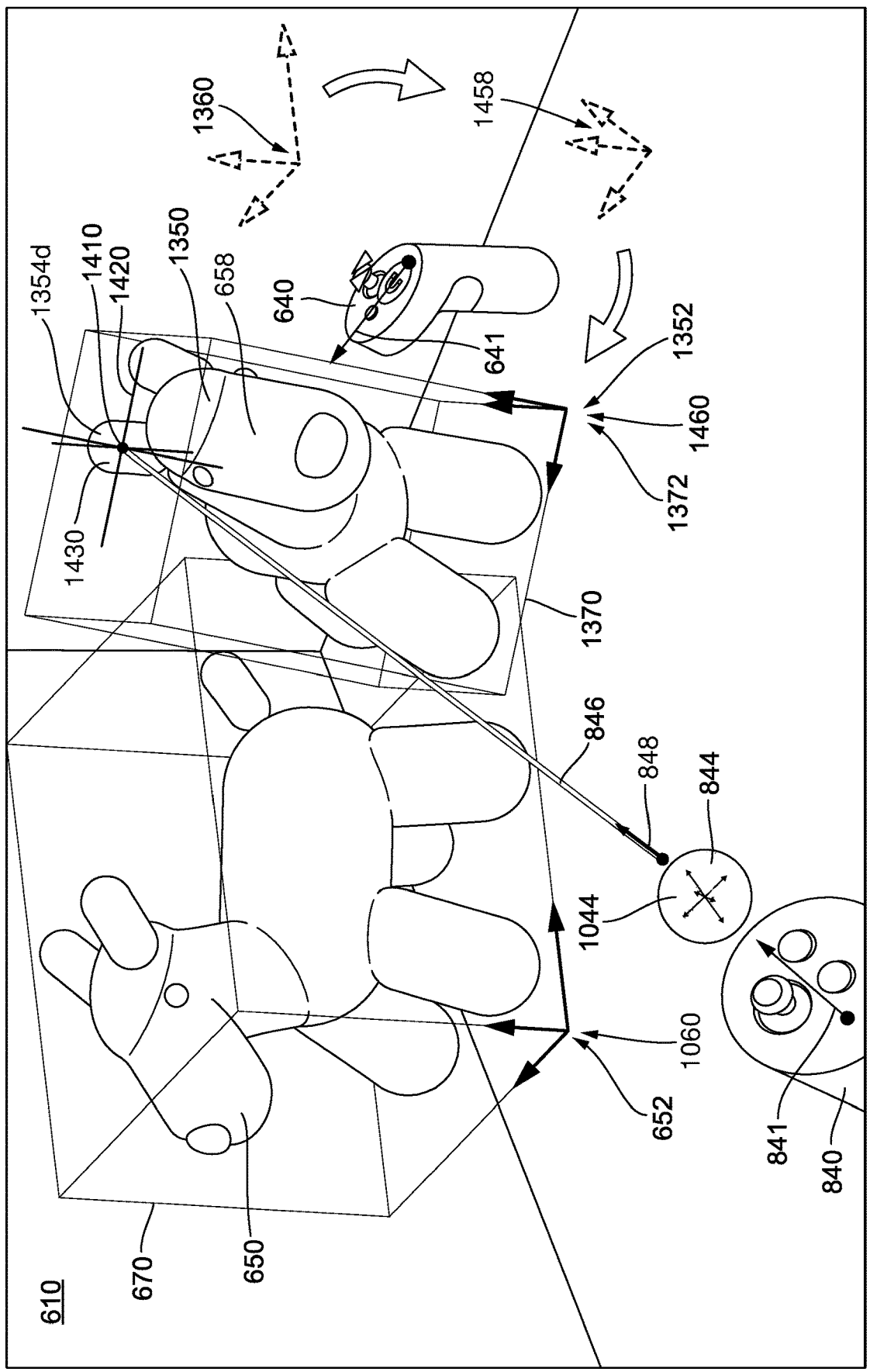
FIG. 14 shows a user view in which an object space orientation of the new virtual object has been reoriented to match an orientation of a reference first component virtual object of the new virtual object.

Next, in FIG. 14, a tenth user view 1400 of the third virtual environment 610 (at an eleventh time after the tenth time shown in FIG. 13) is shown in which the third controller avatar 640 has been used to move the fifth virtual object 1350. In some implementations, a movement tool is provided, during which changes in the third controller pose 641 of the third controller avatar 640 result in the same changes in pose of fifth virtual object 1350. In this example, that resulted in the third object space orientation 1352 being changed from the ninth orientation 1360 to an intermediate tenth orientation 1458. Additionally, much as described in connection with FIGS. 8-10, a third object reorientation mode has been entered in which the second object selection ray 846 is shown extending in a direction toward and contacting the fifth virtual object 1350 at a second intersection point 1410. Based on a determination that the second object selection ray 846 is pointed at the sixth component object 1354*d*, the sixth component object 1354*d* is selected as a third reference virtual object 1430. Based on the determination that the second object selection ray 846 is pointed at the sixth component object 1354*d* and/or the selection of the sixth component object 1354*d* as the third reference virtual object 1430, a third reference object orientation indicator 1420, visually indicating an eleventh orientation 1460 for the sixth component object 1354*d*, is also displayed to the user in response to this user input. In FIG. 14, the eleventh orientation 1460 shown by the third reference object orientation indicator 1420 differs from the intermediate tenth orientation 1458 of the third object space orientation 1352 for the fifth virtual object 1350 and the third bounding box orientation 1372 for the corresponding third bounding box 1370. In this case, the user has submitted a user command input request (for which visual feedback is provided with the second visual appearance 1044), while the second object reorientation mode is active, that the third object space orientation 1352 align with the eleventh orientation 1460. Thus, in FIG. 14, the third object space orientation 1352 and the third bounding box orientation 1372 have the new eleventh orientation 1460 of the third reference virtual object 1430. This process was described in greater detail above with respect to FIGS. 8-10.

Figure 15:
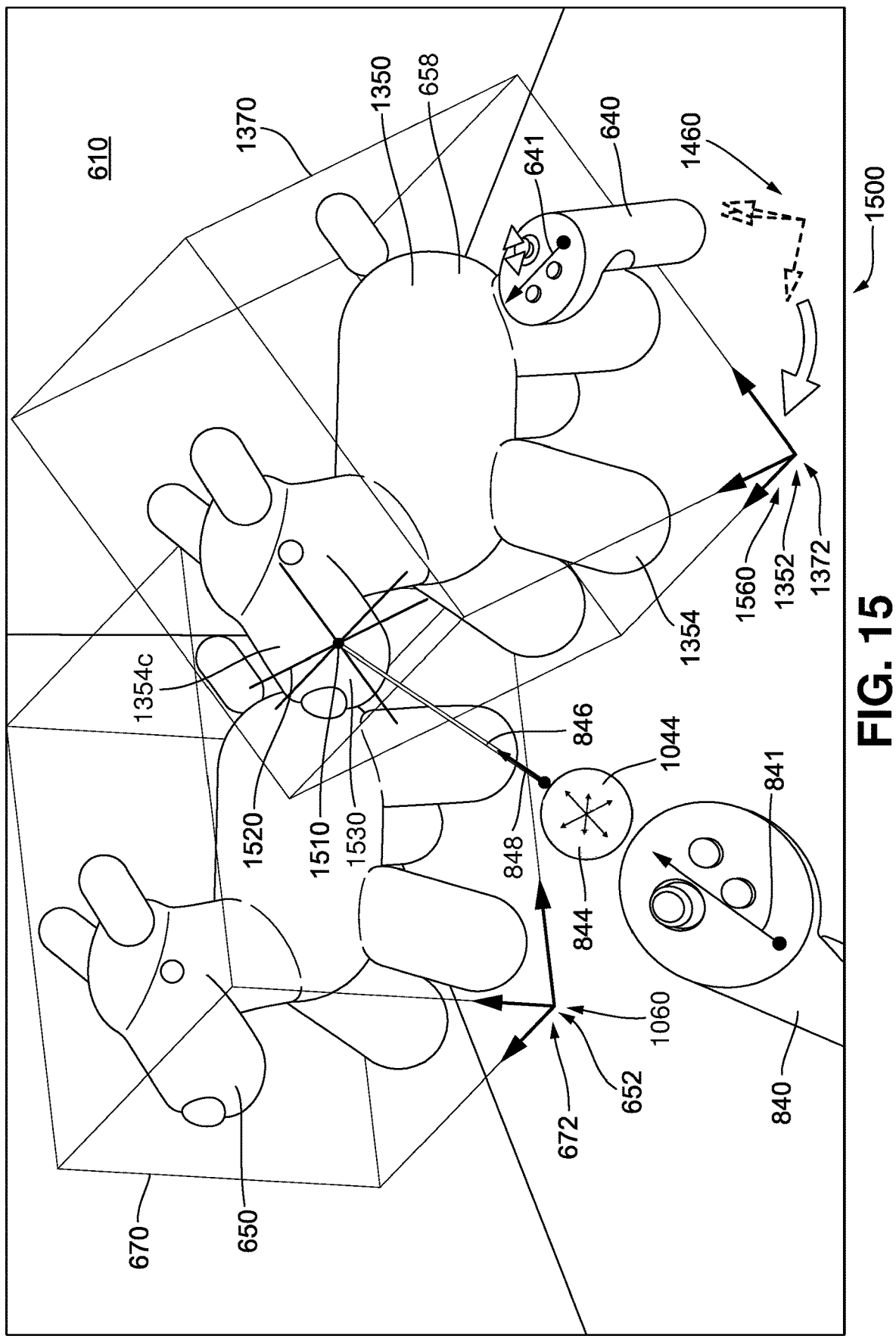
FIG. 15 shows a user view in which the object space orientation of the new virtual object has been further reoriented to instead match an orientation of a reference second component virtual object of the new virtual object.

Continuing the example of FIGS. 13 and 14, dissatisfied with the eleventh orientation 1460, the user has redirected the second object selection ray 846 to the fifth component object 1354*c*. In FIG. 15, an eleventh user view 1500 of the third virtual environment 610 (at a twelfth time after the eleventh time shown in FIG. 14) is shown in which the third controller avatar 640 has been used to move the fifth virtual object 1350. Also, as in FIG. 14, the third object reorientation mode has been entered in which the second object selection ray 846 is shown extending in a direction toward and contacting the fifth component object 1354*c* at a third intersection point 1510. Based on a determination that the second object selection ray 846 is pointed at the fifth component object 1354*c*, the fifth component object 1354*c* is selected as a fourth reference virtual object 1530. Based on the determination that the second object selection ray 846 is pointed at the fifth component object 1354*c* and/or the selection of the fifth component object 1354*c* as the fourth reference virtual object 1530, a third reference object orientation indicator 1520, visually indicating a twelfth orientation 1560 for the fifth component object 1354*c*, is also displayed to the user in response to this user input. In FIG. 15, the twelfth orientation 1560 for the fifth child object 1354*c* differs from the eleventh orientation 1460 of the third object space orientation 1352 for the fifth virtual object 1350 and the third bounding box orientation 1372 for the corresponding third bounding box 1370. In this case, the user has submitted a user command input request (for which visual feedback is provided with the second visual appearance 1044), while the second object reorientation mode is active, that the third object space orientation 1352 align with the fourth reference virtual object 1530. Thus, in FIG. 15, third object space orientation 1352 and the third bounding box orientation 1372 have the twelfth orientation 1560 of the selected fourth reference virtual object 1530. This process was described in greater detail above with respect to FIGS. 8-10.

Figure 16:
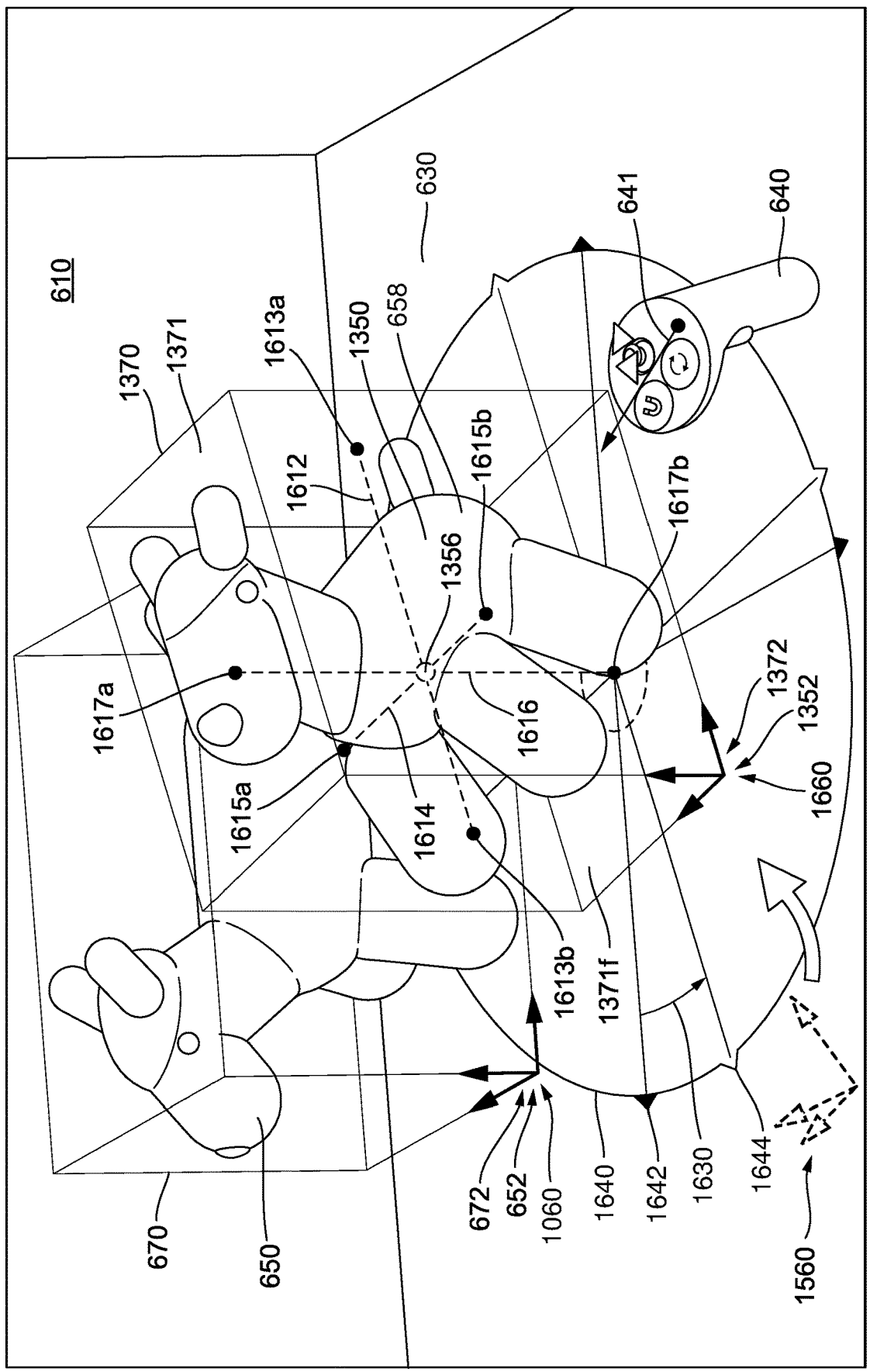
FIG. 16 shows a user view in which the reoriented virtual object of FIG. 15 has been snapped and rotated much as in FIG. 12.

In FIG. 16, a thirteenth view 1600 of the third virtual environment 610 (at a thirteenth time after the twelfth time shown in FIG. 15) is shown. Much as described above in connection with FIG. 12, using the new third object space orientation 1352 established in FIG. 15 having the twelfth orientation 1560, the fifth virtual object 1350 has been brought into contact with the third surface 630 and rotated by an angle 1630, resulting in the fifth virtual object 1350 being in a thirteenth orientation 1660. By having reoriented the fifth virtual object 1350 differently than the third virtual object 650, each of the two virtual objects 650 and 1350 can be conveniently manipulated using primarily hand movements within the mixed reality interface being provided.

Figure 17:
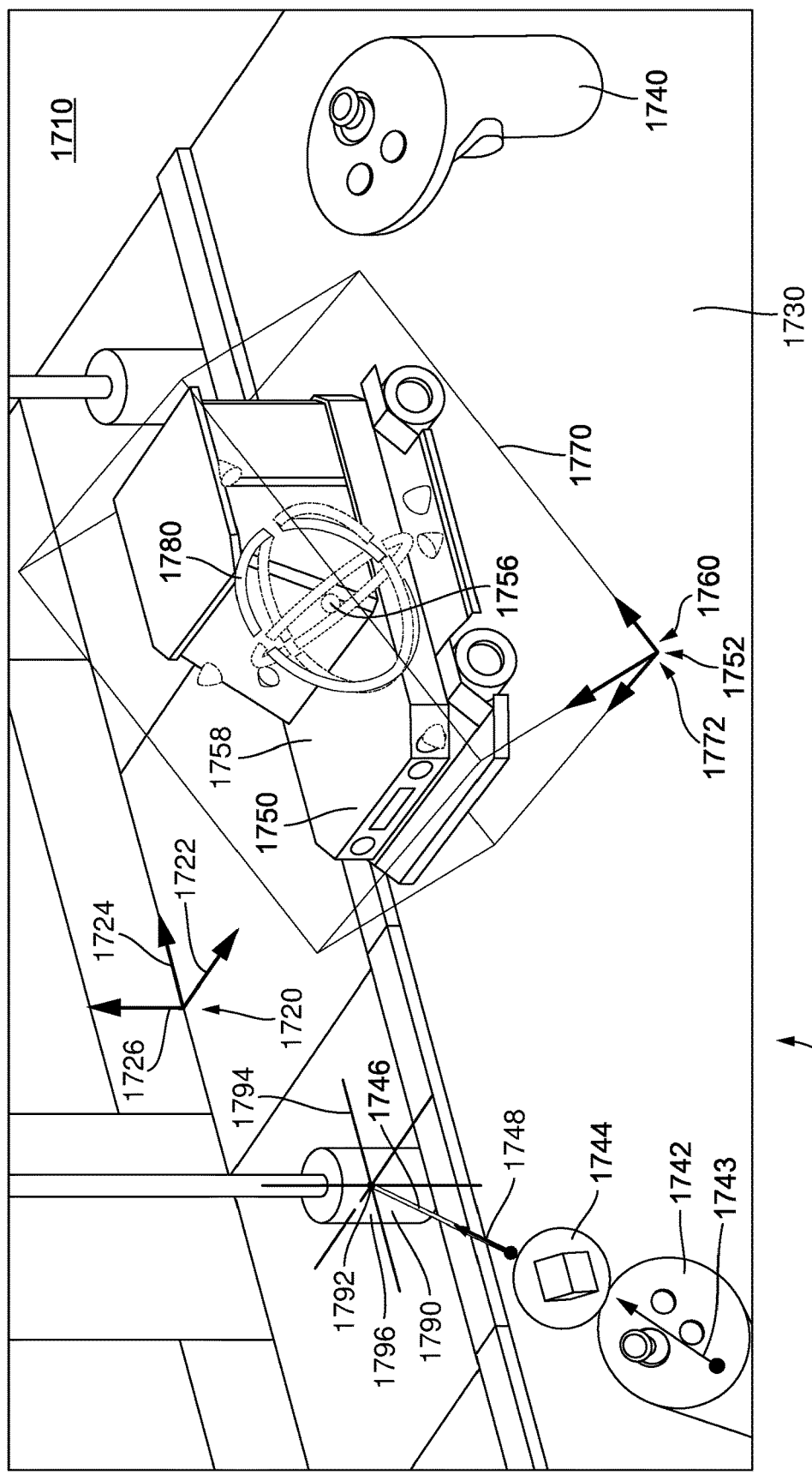
FIG. 17 shows a user view of a different virtual environment showing a virtual object with an undesired object space orientation and an activated reorientation mode.
Figure 18:
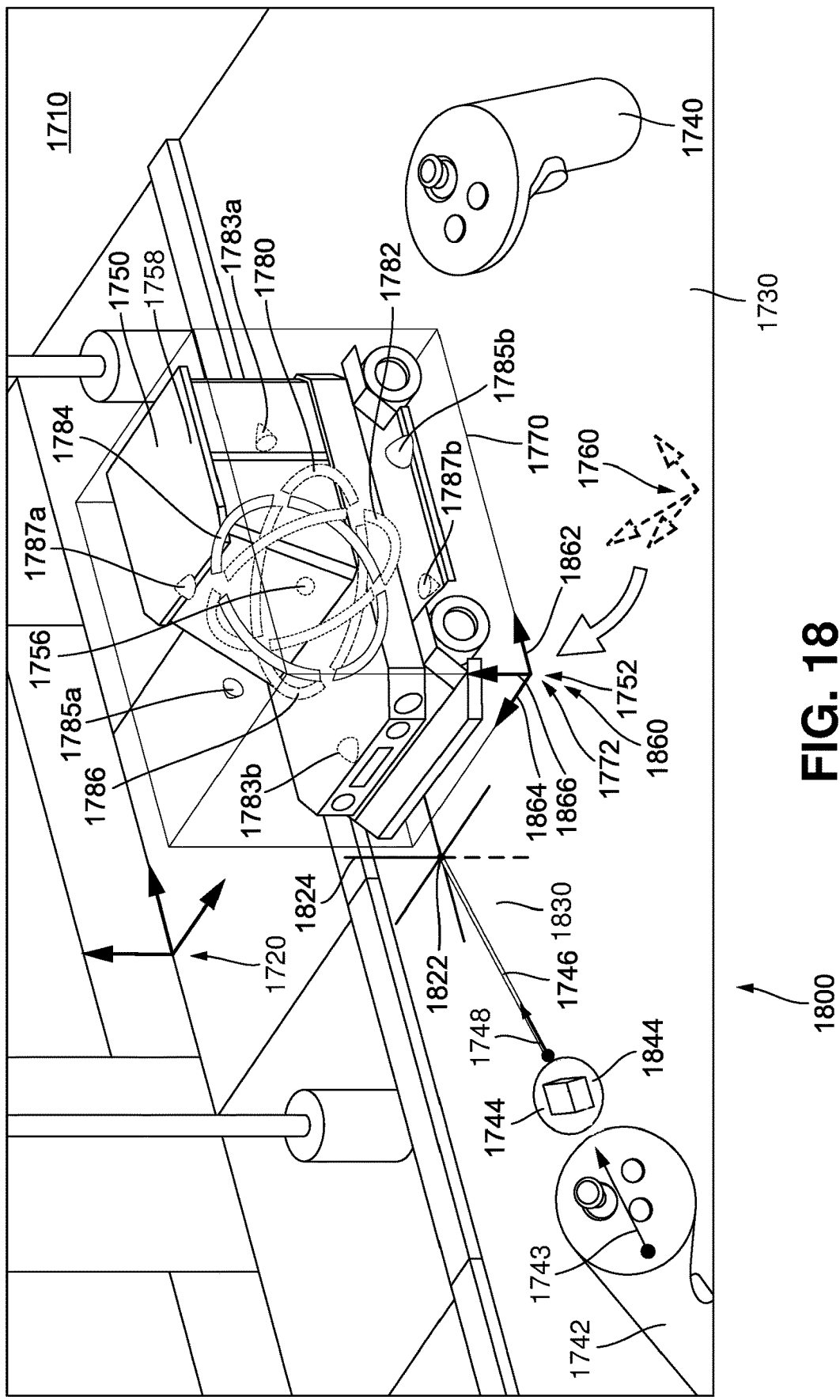
FIG. 18 shows a user view in which the object space orientation of the virtual object of FIG. 17 has been reoriented to match an orientation of a different virtual object.

Referring now to FIGS. 17 and 18, a fourth virtual environment 1710 is illustrated. In FIG. 17, a fourteenth user view 1700 of the fourth virtual environment 1710 (at a fourteenth time) and an associated fourth global space orientation 1720, with axes 1722, 1724, and 1726, is shown. Additionally, there is a fourth planar surface 1730, which forms a 'street' for the scene shown in FIG. 17. The scene also includes a sixth virtual object ("sixth object") 1750 with a fourth object space orientation 1752 in a fourteenth orientation 1760. Also, as described with respect to previous examples, a fourth bounding box 1770 having a fourth bounding box orientation 1772 is shown for the sixth virtual object 1750 in the thirteenth orientation 1760. Much as described in connection with FIGS. 9, 10, 14 and 15, a fourth object reorientation mode has been activated in connection with a sixth controller avatar 1742 associated with the user's left hand (the fourteenth user view 1700 also includes a fifth controller avatar 1740 associated with the user's right hand), and a user-directed third object selection ray 1746, with a third second object selection pose 1748 that is directed in association with a sixth controller pose 1743 for the sixth controller avatar 1742, is in contact with a seventh virtual object 1790 at a virtual intersection point 1792. Based on a determination that the third object selection ray 1746 is pointed at the seventh virtual object 1790, the seventh virtual object 1790 is selected as a fifth reference virtual object 1796. Based on the determination that the third object selection ray 1746 is pointed at the seventh virtual object 1790 and/or the selection of the seventh virtual object 1790 as the fifth reference virtual object 1796, a fifth reference object orientation indicator 1794, visually indicating an orientation for the seventh virtual object 1790, is also displayed, but has not been selected by the user. Also, about a pivot point 1756 for the sixth virtual object 1750 is shown a gimbal 1780 for rotating and translating the sixth virtual object 1750. The gimbal 1780 will be discussed in greater detail in connection with FIG. 18.

In this example, the sixth virtual object 1750 was not well aligned with the street surface 1730. To address this, the user has rotated the sixth virtual object 1750 into the fourteenth orientation 1760 shown in FIG. 17 to get a bottom portion of the sixth virtual object 1750 aligned with the street surface 1730. However, it is not convenient to move the sixth virtual object 1750 from the particular position and/or orientation shown in FIG. 17. Although such movements can be performed by the user, such movements require additional user actions in comparison to a better oriented fourth object space orientation 1752. Examples of such additional user actions may include, but are not limited to, manual fine adjustments of position after making a movement, convoluted sequences of operations to realign the fourth object space orientation 1752 (such as manually creating a new object with a desired orientation, de-parenting the component objects of the sixth virtual object 1750, and re-parenting the components objects to the newly created object), or additional operations performed to force use of the fourth global space orientation 1720 for manipulating the sixth virtual object 1750 (although this is not useful for snapping the sixth virtual object 1750 to surfaces in the fourth virtual environment 1710 in the manner previously described in connection with FIGS. 11 and 12).

Continuing the example of FIG. 17, in FIG. 18 a fifteenth user view 1800 of the fourth virtual environment 1710 (at a fifteenth time after the fourteenth time shown in FIG. 17) is shown, in which the third object selection ray 1746 has been redirected to an intersection point 1822 on the street surface 1730 having a fifteenth orientation 1860 that the user wishes to have the sixth virtual object 1750 match. In some implementations, if the third object selection ray 1746 does not intersect a virtual object, the fourth global space orientation 1720 will be used for reorientation. A corresponding sixth reference object orientation indicator 1824 is shown and, with the fourth surface 1730 selected as a sixth reference virtual object 1830, has been used to select the indicated new fifteenth orientation 1860 for the fourth object space orientation 1752 of the sixth virtual object 1750 (for which visual feedback is provided with a third visual appearance 1844 similar to the second visual appearance 1044 in FIGS. 10, 14, and 15). Accordingly, the fourth bounding box orientation 1772 of the fourth bounding box 1770 is also in the fourteenth orientation 1860, and the gimbal 1780 is also aligned according to the fifteenth orientation 1860. The gimbal 1780 includes rotation controls 1782, 1784, and 1786, each used to rotate the sixth virtual object 1750 about respective axes passing through the pivot point 1756 and parallel to respective axes 1862, 1864, and 1866 for the fourth object space orientation 1752. Further, the gimbal 1780 provides translation controls 1783*a* and 1783*b* for translating the sixth virtual object 1750 in the direction of the axis 1862, translation controls 1785*a* and 1785*b* for translating the sixth virtual object 1750 in the direction of the axis 1864, and translation controls 1787*a* and 1787*b* for translating the sixth virtual object 1750 in the direction of the axis 1866. With the new fifteenth orientation 1860 shown in FIG. 18, the various orientation and translation operations made available by the gimbal 1780 are far more effective and efficient than in the initial fourteenth orientation 1760 seen in FIG. 17. It is understood that the examples in FIGS. 17-18 may be implemented using and/or in combination with the various devices, systems, elements, and features described herein.

Figure 19:
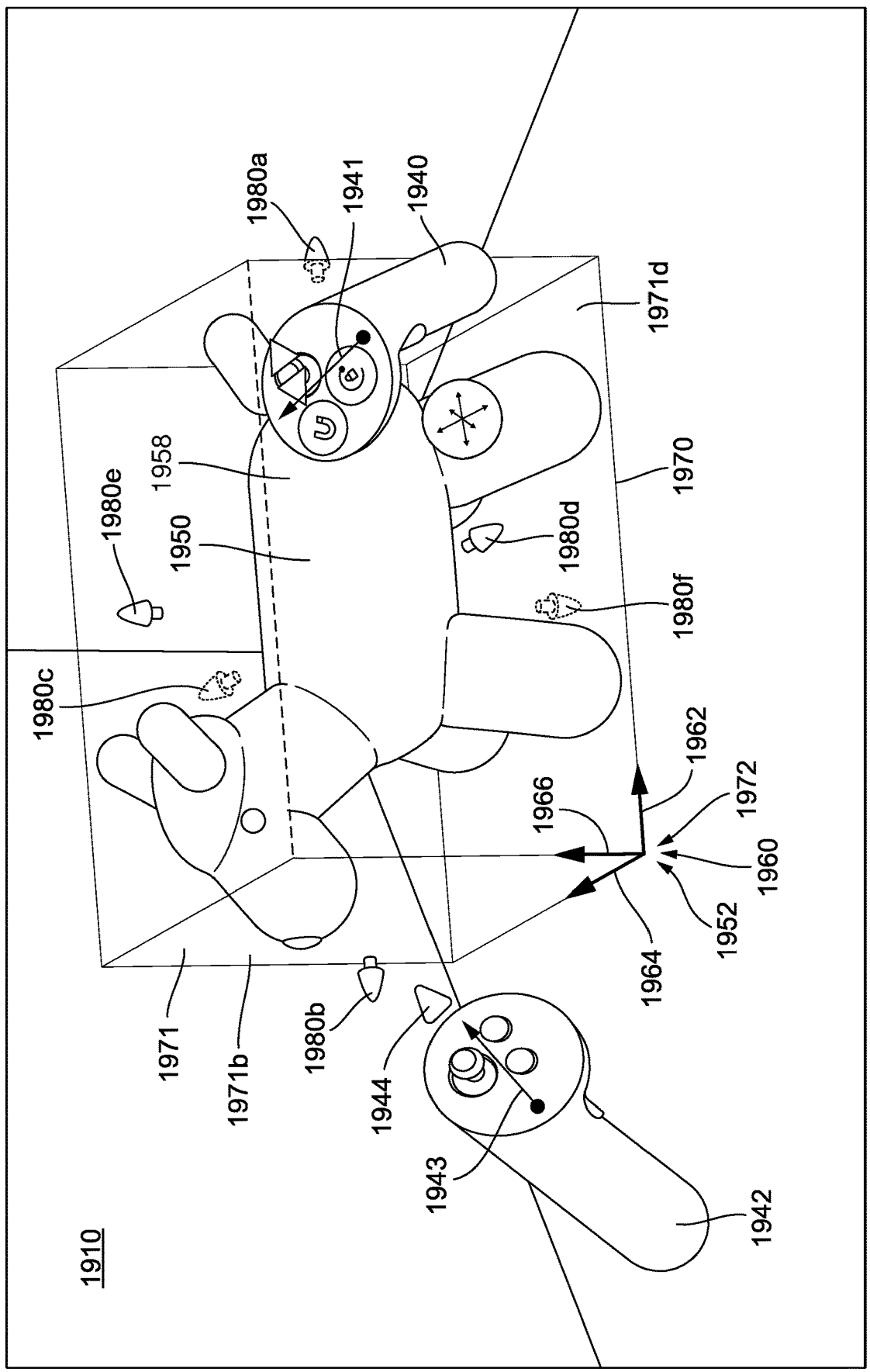
FIGS. 19-22 show an example of an alternate technique for reorienting a virtual object from the examples shown in FIGS. 6-18.

FIGS. 19-22 show an example of an alternate technique for reorienting a virtual object from the examples shown in FIGS. 6-18. It is understood that the examples in FIGS. 19-22 may be implemented using and/or in combination with the various devices, systems, elements, and features described herein. FIG. 19 shows a sixteenth user view 1900 of a fifth virtual environment 1910 (at a sixteenth time) including an eighth virtual object ("eighth object") 1950 that is substantially similar to the third virtual object 650 discussed in FIGS. 6-16. The eighth virtual object 1950 has a fifth object space orientation 1952 and fifth bounding box orientation 1972 both in a sixteenth orientation 1960 with axes 1962, 1964, and 1966. Additionally, in association with respective faces 1971 of the fifth bounding box 1970 for the eighth virtual object 1950, are shown object reorientation elements 1980*a*, 1980*b*, 1980*c*, 1980*d*, 1980*e*, and 1980*f*, in which the object reorientation element 1980*b* is on, intersects, or is proximate to a face 1971*b*, and the object reorientation element 1980*d* is on, intersects, or is proximate to a face 1971*d*. In FIG. 19, a tool selection pointer 1944 of a seventh controller avatar 1942 (associated with a user's left hand) is being brought into proximity, and ultimately in contact with, the object reorientation element 1980*b* which will cause a transition into an object reorientation mode.

Figure 20:
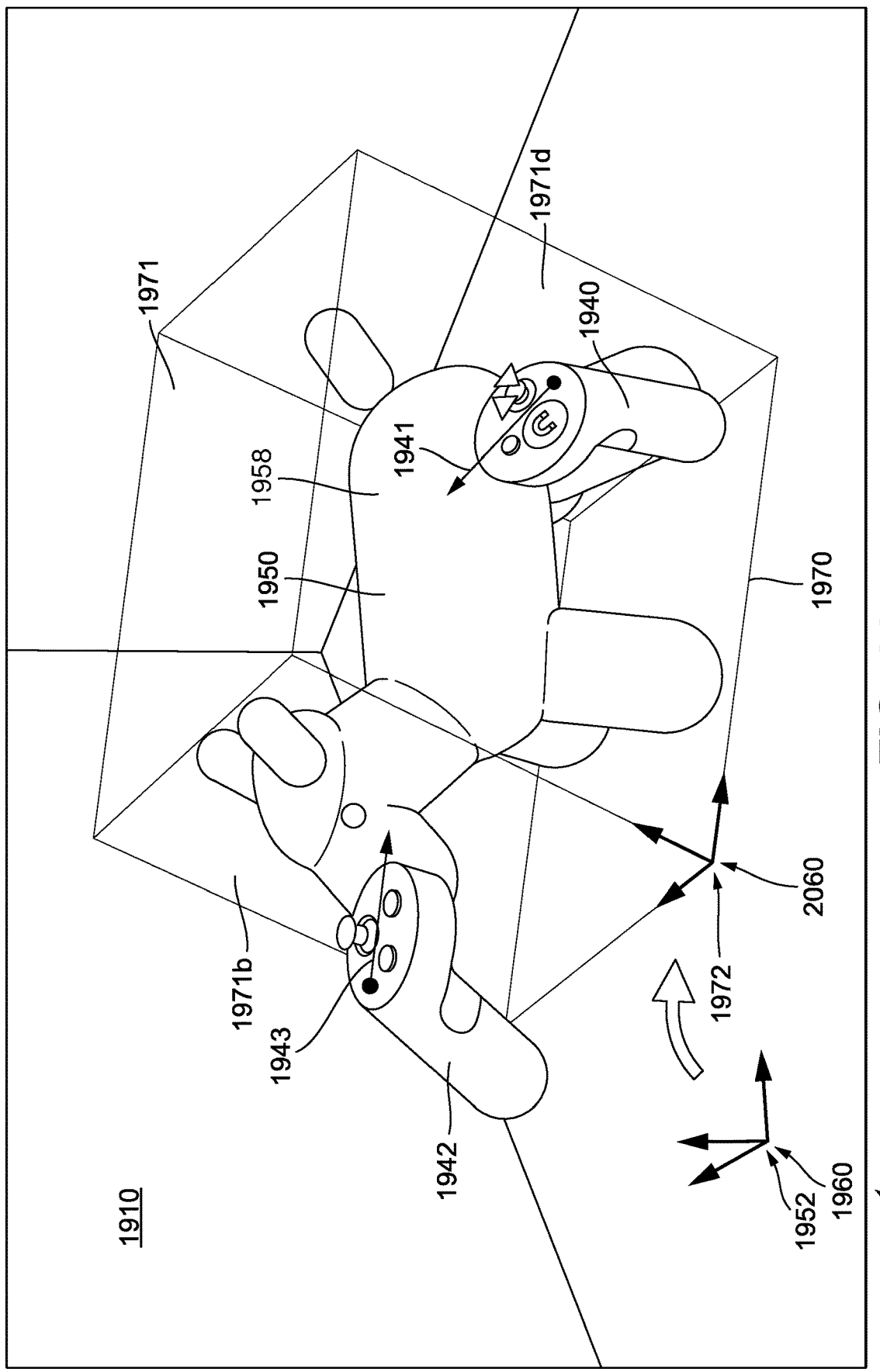

In FIG. 20, a seventeenth user view 2000 of the fifth virtual environment 1910 (at a seventeenth time after the sixteenth time shown in FIG. 19) is shown in which a fifth object reorientation mode is active or engaged. In this example, the seventh controller avatar 1942 is coupled to the face 1971*b* such that changes in a seventh controller pose 1943 of the seventh controller avatar 1942 result in corresponding changes in orientation of the face 1971*b*. Similarly, an eighth controller avatar 1940 (associated with the user's right hand) is coupled to the face 1971*d*, such that changes in an eighth controller pose 1941 of the eighth controller avatar 1940 result in corresponding changes in orientation of the face 1971*d*. By manipulating the controller avatars 1940 and 1942, corresponding changes in the orientations of the faces 1971*d* and 1971*b* have changed the fifth bounding box orientation 1972 to a seventeenth orientation 2060. Meanwhile, the fifth object space orientation 1952 for the eighth virtual object 1950 continues to remain in the sixteenth orientation 1960 shown in FIG. 19.

Figure 21:
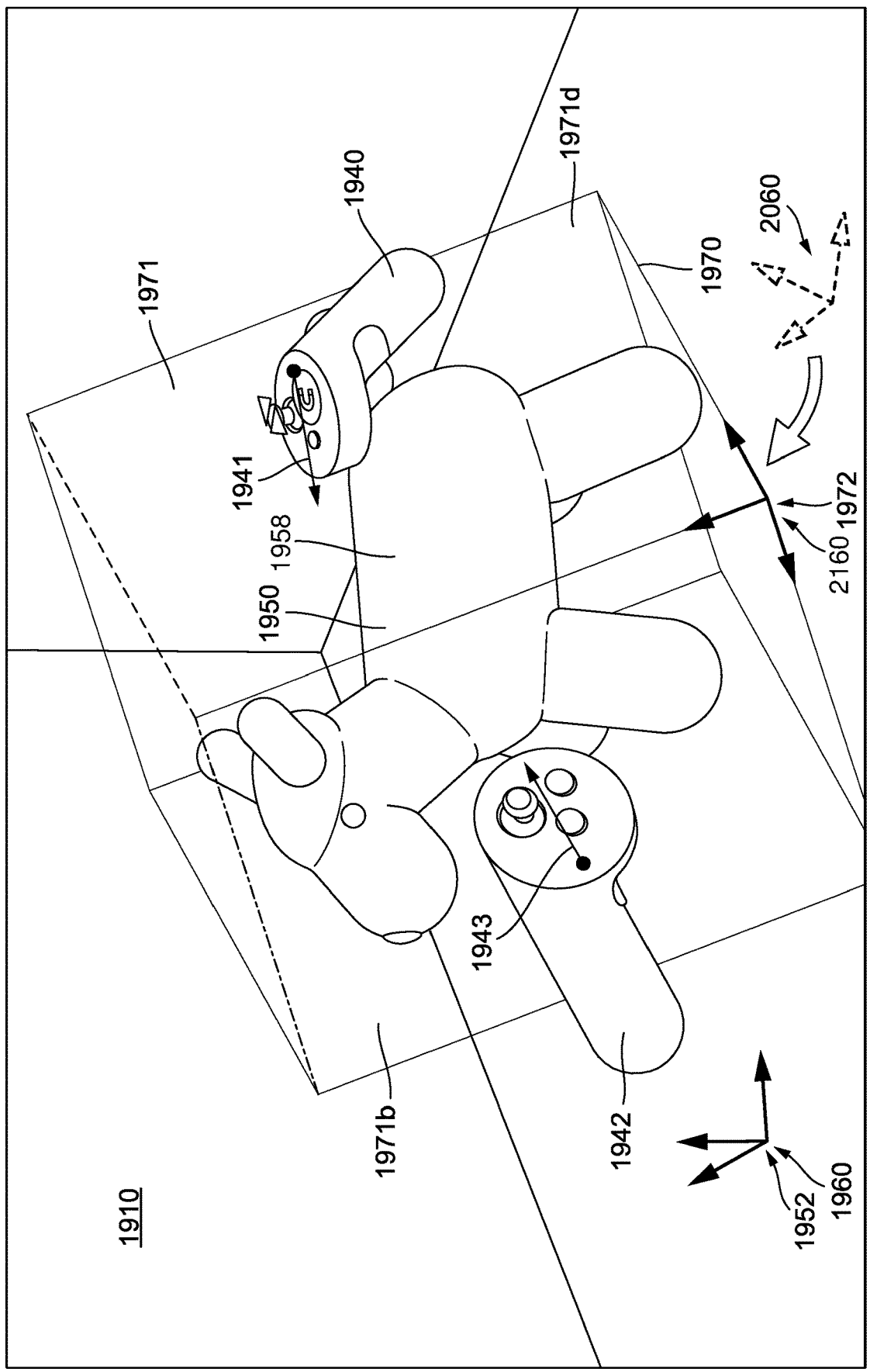

In FIG. 21, an eighteenth user view 2100 of the fifth virtual environment 1910 (at an eighteenth time after the seventeenth time shown in FIG. 20) is shown in which the fifth object reorientation mode shown in FIG. 20 continues to remain enabled, and the controller avatars 1940 and 1942 remain coupled to their respective faces 1971*d* and 1971*b* of the fifth bounding box 1970. The controller avatars 1940 and 1942 have been moved further resulting in the fifth bounding box orientation 1972 further changing from seventeenth orientation 2060 shown in FIG. 20 to a new eighteenth orientation 2160. As in FIG. 20, the fifth object space orientation 1952 for the eighth virtual object 1950 still remains in the sixteenth orientation 1960 shown in FIG. 19.

Figure 22:
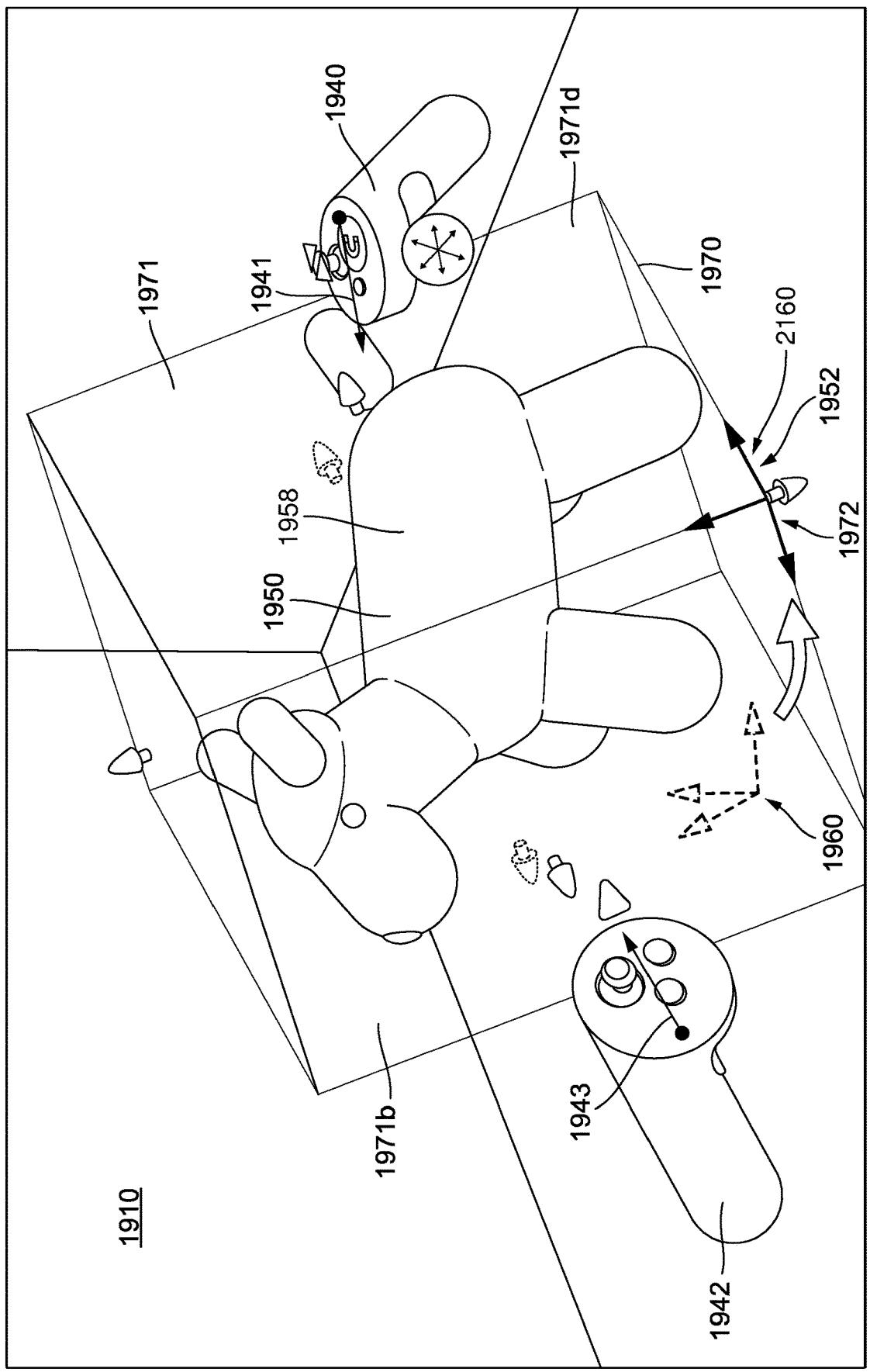

FIG. 22 shows a nineteenth user view 2200 of the fifth virtual environment 1910 (at a nineteenth time after the eighteenth time shown in FIG. 21) in which, while the fifth bounding box 1970 is in the eighteenth orientation 2160 of FIG. 21, the fifth object reorientation mode that was active in FIGS. 20 and 21 has been deactivated. The fifth bounding box orientation 1972 in the eighteenth orientation 2160 is used as a new orientation for the fifth object space orientation 1952 of the eighth virtual object 1950, replacing the sixteenth orientation 1960 shown for the fifth object space orientation 1952 in FIGS. 19-21.

Figure 23:
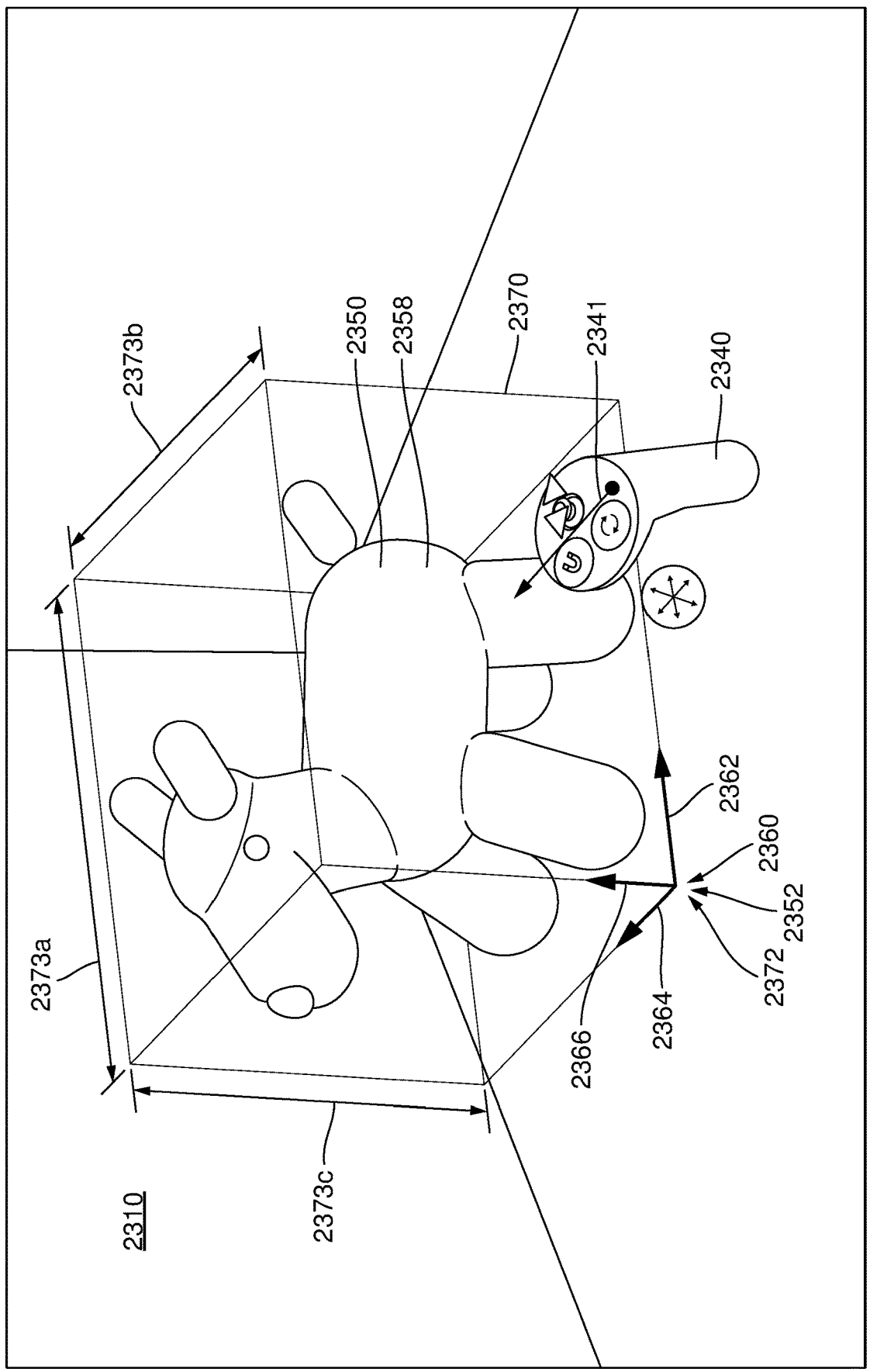
FIGS. 23-25 show an example of another alternative technique for reorienting a virtual object from the examples shown in FIGS. 6-22.
Figure 24:
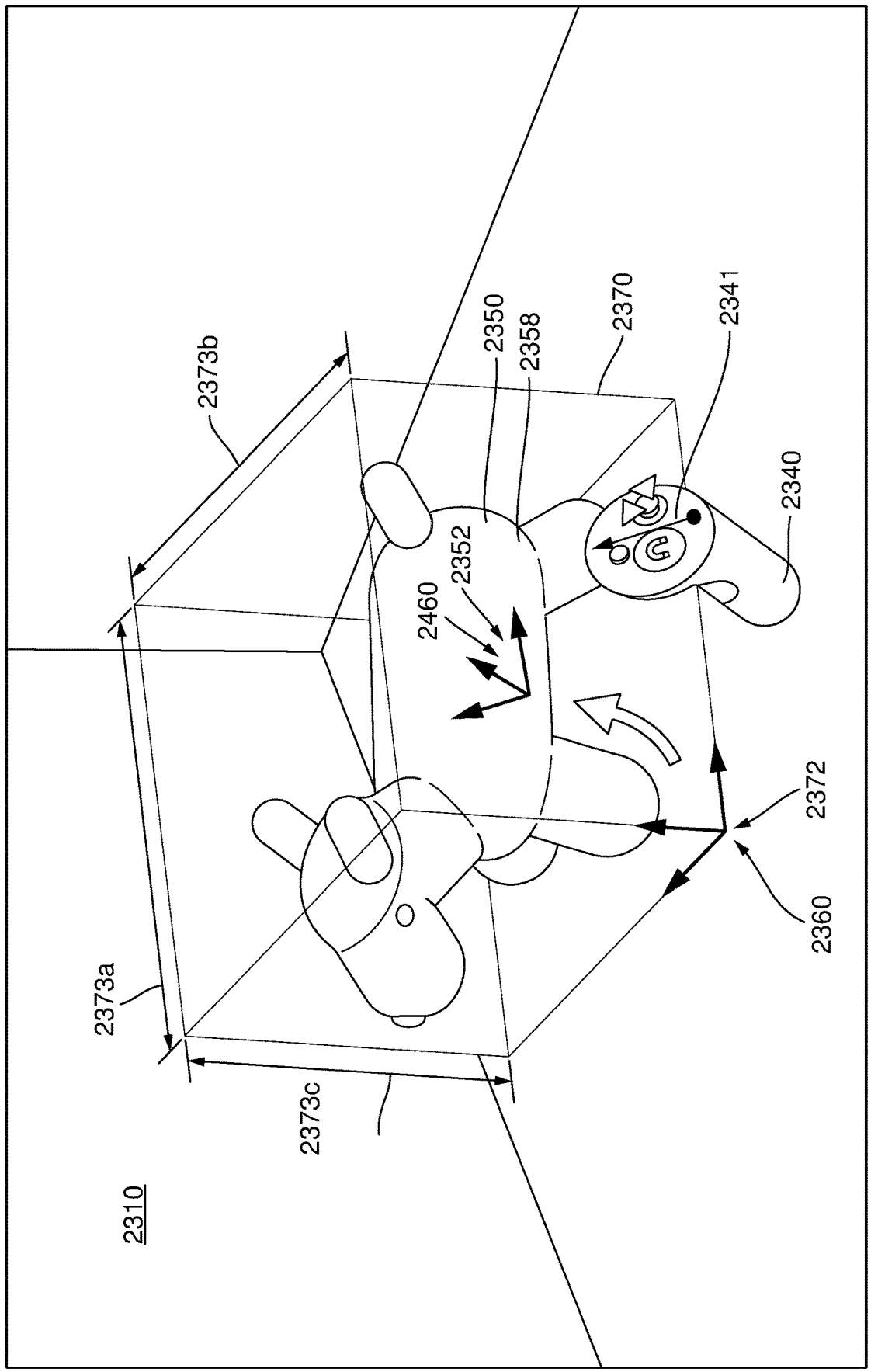
Figure 25:
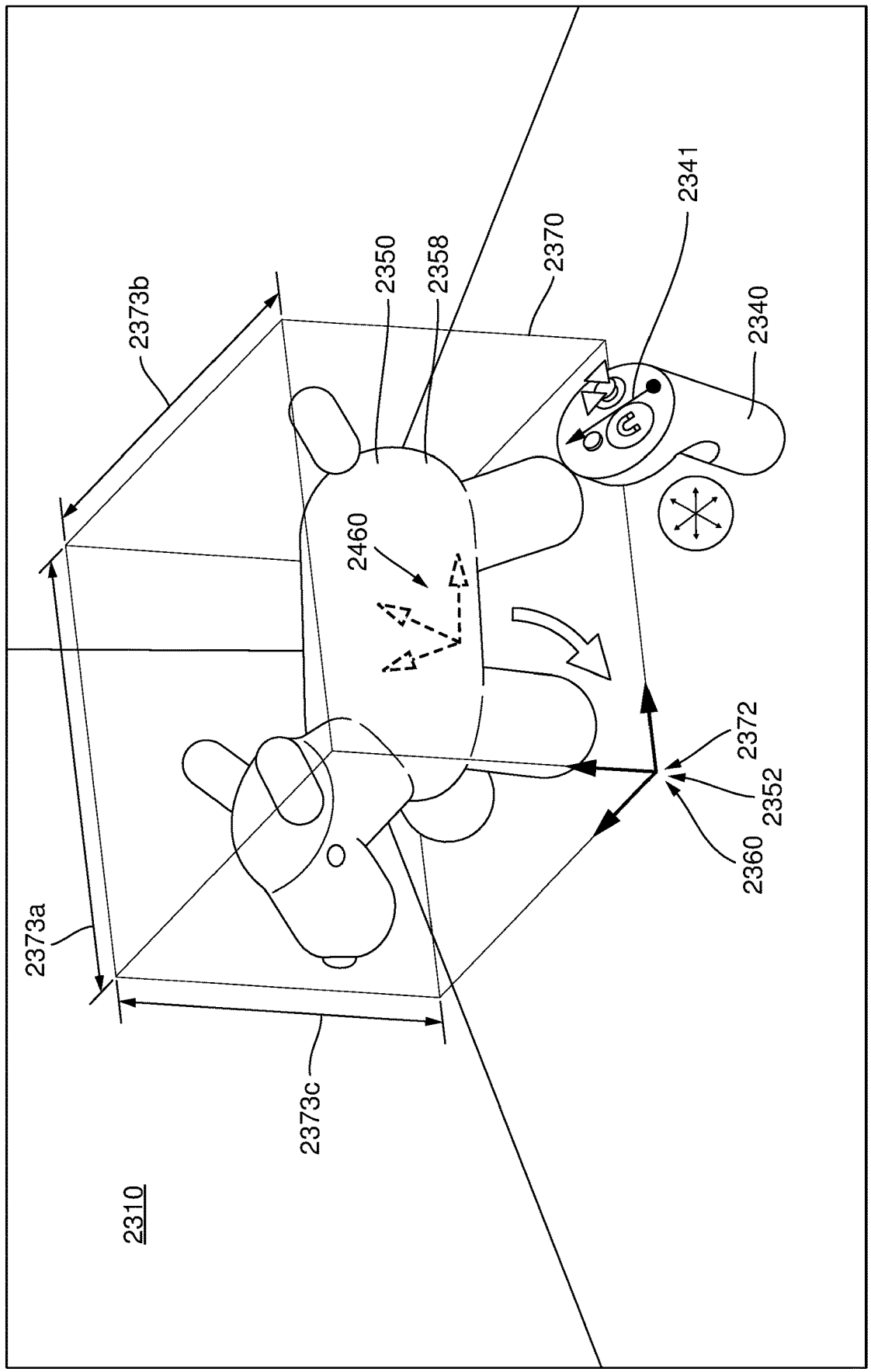

FIGS. 23-25 show another alternative in which, instead of rotating a bounding box around its respective virtual object, the virtual object is instead rotated within its bounding box. It is understood that the examples in FIGS. 23-25 may be implemented using and/or in combination with the various devices, systems, elements, and features described herein. FIG. 23 shows a twentieth user view 2300 of a sixth virtual environment 2310 (at a twentieth time) including an ninth virtual object ("ninth object") 2350 with a sixth object space orientation 2352 and a sixth bounding box orientation 2372 of a sixth bounding box 2370 shown in a nineteenth orientation 2360, with respective axes 2362, 2364, and 2366. Additionally, dimensions 2373a, 2373b, and 2373c of the sixth bounding box 2370 for the ninth virtual object 2350 are shown. Also, a ninth controller avatar 2340 with a ninth controller pose 2341 is presented at a time in which a sixth object reorientation mode is activated.

FIG. 24 shows a twenty-first user view 2400 of the sixth virtual environment 2310 (at a twenty-first time after the twentieth time shown in FIG. 23) in which the sixth object reorientation mode remains active and the ninth controller avatar 2340 has been rotated, causing a corresponding rotation of the ninth virtual object 2350 from the nineteenth orientation 2360 shown in FIG. 23 to a new sixth object space orientation 2352 with a twentieth orientation 2460. At the time shown in FIG. 24, the sixth bounding box orientation 2372 remains in the nineteenth orientation 2360 and is different from the sixth object space orientation 2352. FIG. 25 shows a twenty-second user view 2500 of the sixth virtual environment 2310 (at a twenty-second time after the twenty-first time shown in FIG. 24) in which the sixth object reorientation mode has been deactivated. As a result, the sixth bounding box orientation 2372, which has remained in the nineteenth orientation 2360, is used as the sixth object space orientation 2352, replacing the twentieth orientation 2460 shown in FIG. 24. As shown in FIGS. 24 and 25, as a result of the rotation of the ninth virtual object 2350, the dimensions 2373a, 2373b, and 2373c of the sixth bounding box 2370 are changed from FIG. 23.

The detailed examples of systems, devices, and techniques described in connection with FIGS. 1-25 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-25 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 26:
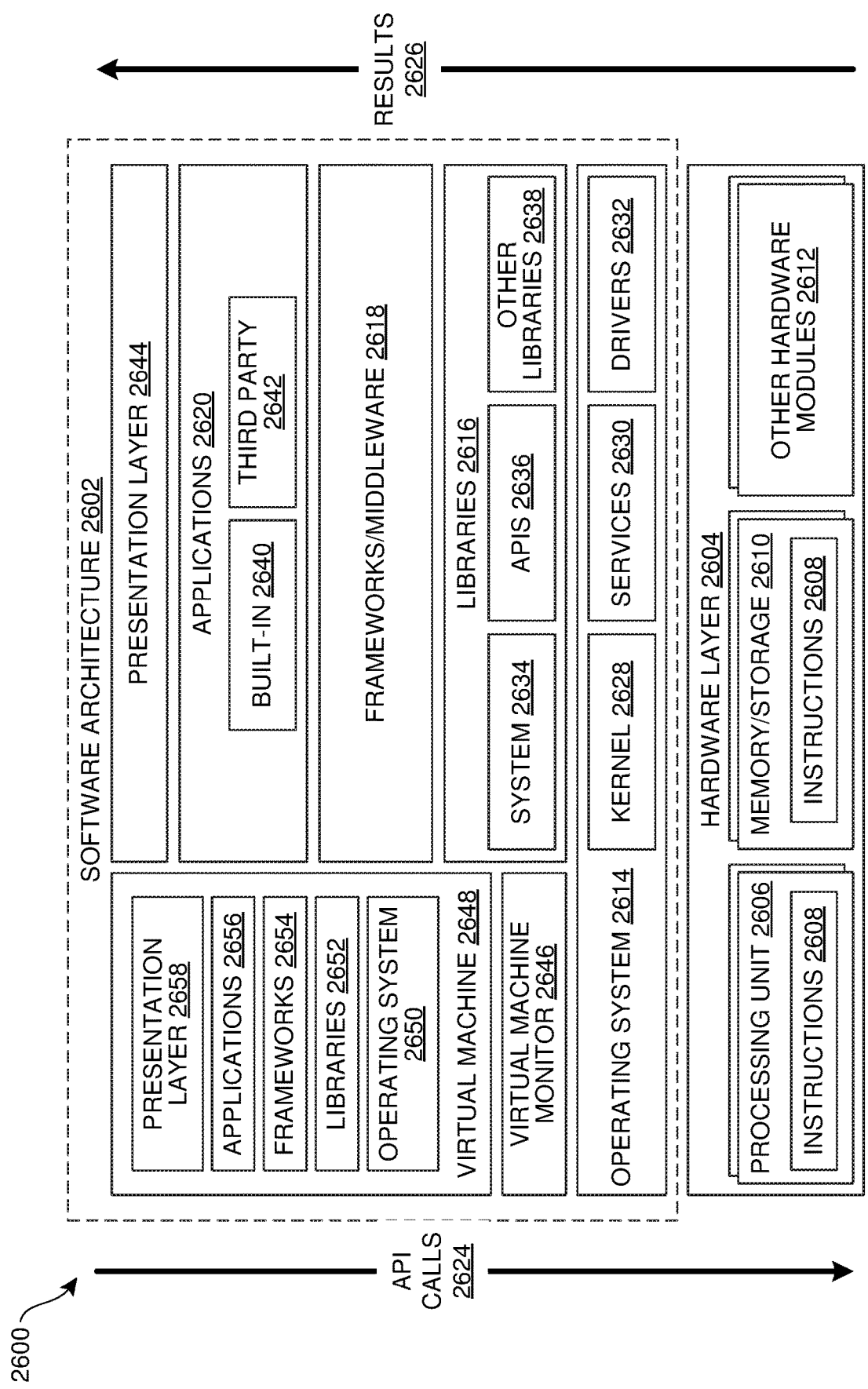
FIG. 26 is a block diagram illustrating an example software architecture, various portions of which may be used in conjunction with various hardware architectures herein described, which may implement any of the features herein described.

FIG. 26 is a block diagram 2600 illustrating an example software architecture 2602, various portions of which may be used in conjunction with various hardware architectures herein described, which may implement any of the above-described features. FIG. 26 is a non-limiting example of a software architecture and it will be appreciated that many other architectures may be implemented to facilitate the functionality described herein. The software architecture 2602 may execute on hardware such as a machine 2700 of FIG. 27 that includes, among other things, processors 2710, memory 2730, and input/output (I/O) components 2750. A representative hardware layer 2604 is illustrated and can represent, for example, the machine 2700 of FIG. 27. The representative hardware layer 2604 includes a processing unit 2606 and associated executable instructions 2608. The executable instructions 2608 represent executable instructions of the software architecture 2602, including implementation of the methods, modules and so forth described herein. The hardware layer 2604 also includes a memory/storage 2610, which also includes the executable instructions 2608 and accompanying data. The hardware layer 2604 may also include other hardware modules 2612. Instructions 2608 held by processing unit 2608 may be portions of instructions 2608 held by the memory/storage 2610.

The example software architecture 2602 may be conceptualized as layers, each providing various functionality. For example, the software architecture 2602 may include layers and components such as an operating system (OS) 2614, libraries 2616, frameworks 2618, applications 2620, and a presentation layer 2650. Operationally, the applications 2620 and/or other components within the layers may invoke API calls 2624 to other layers and receive corresponding results 2626. The layers illustrated are representative in nature and other software architectures may include additional or different layers. For example, some mobile or special purpose operating systems may not provide the frameworks/middleware 2618.

The OS 2614 may manage hardware resources and provide common services. The OS 2614 may include, for example, a kernel 2628, services 2630, and drivers 2632. The kernel 2628 may act as an abstraction layer between the hardware layer 2604 and other software layers. For example, the kernel 2628 may be responsible for memory management, processor management (for example, scheduling), component management, networking, security settings, and so on. The services 2630 may provide other common services for the other software layers. The drivers 2632 may be responsible for controlling or interfacing with the underlying hardware layer 2604. For instance, the drivers 2632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 2616 may provide a common infrastructure that may be used by the applications 2620 and/or other components and/or layers. The libraries 2616 typically provide functionality for use by other software modules to perform tasks, rather than rather than interacting directly with the OS 2614. The libraries 2616 may include system libraries 2634 (for example, C standard library) that may provide functions such as memory allocation, string manipulation, file operations. In addition, the libraries 2616 may include API libraries 2636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 2616 may also include a wide variety of other libraries 2638 to provide many functions for applications 2620 and other software modules.

The frameworks 2618 (also sometimes referred to as middleware) provide a higher-level common infrastructure that may be used by the applications 2620 and/or other software modules. For example, the frameworks 2618 may provide various graphic user interface (GUI) functions, high-level resource management, or high-level location services. The frameworks 2618 may provide a broad spectrum of other APIs for applications 2620 and/or other software modules.

The applications 2620 include built-in applications 2640 and/or third-party applications 2642. Examples of built-in applications 2640 may include, but are not limited to, a contacts application, a browser application, a location application, a media application, a messaging application, and/or a game application. Third-party applications 2642 may include any applications developed by an entity other than the vendor of the particular platform. The applications 2620 may use functions available via OS 2614, libraries 2616, frameworks 2618, and presentation layer 2650 to create user interfaces to interact with users.

Some software architectures use virtual machines, as illustrated by a virtual machine 2648. The virtual machine 2648 provides an execution environment where applications/modules can execute as if they were executing on a hardware machine (such as the machine 2700 of FIG. 27, for example). The virtual machine 2648 may be hosted by a host OS (for example, OS 2614) or hypervisor, and may have a virtual machine monitor 2646 which manages operation of the virtual machine 2648 and interoperation with the host operating system. A software architecture, which may be different from software architecture 2602 outside of the virtual machine, executes within the virtual machine 2648 such as an OS 2650, libraries 2652, frameworks 2654, applications 2656, and/or a presentation layer 2658.

Figure 27:
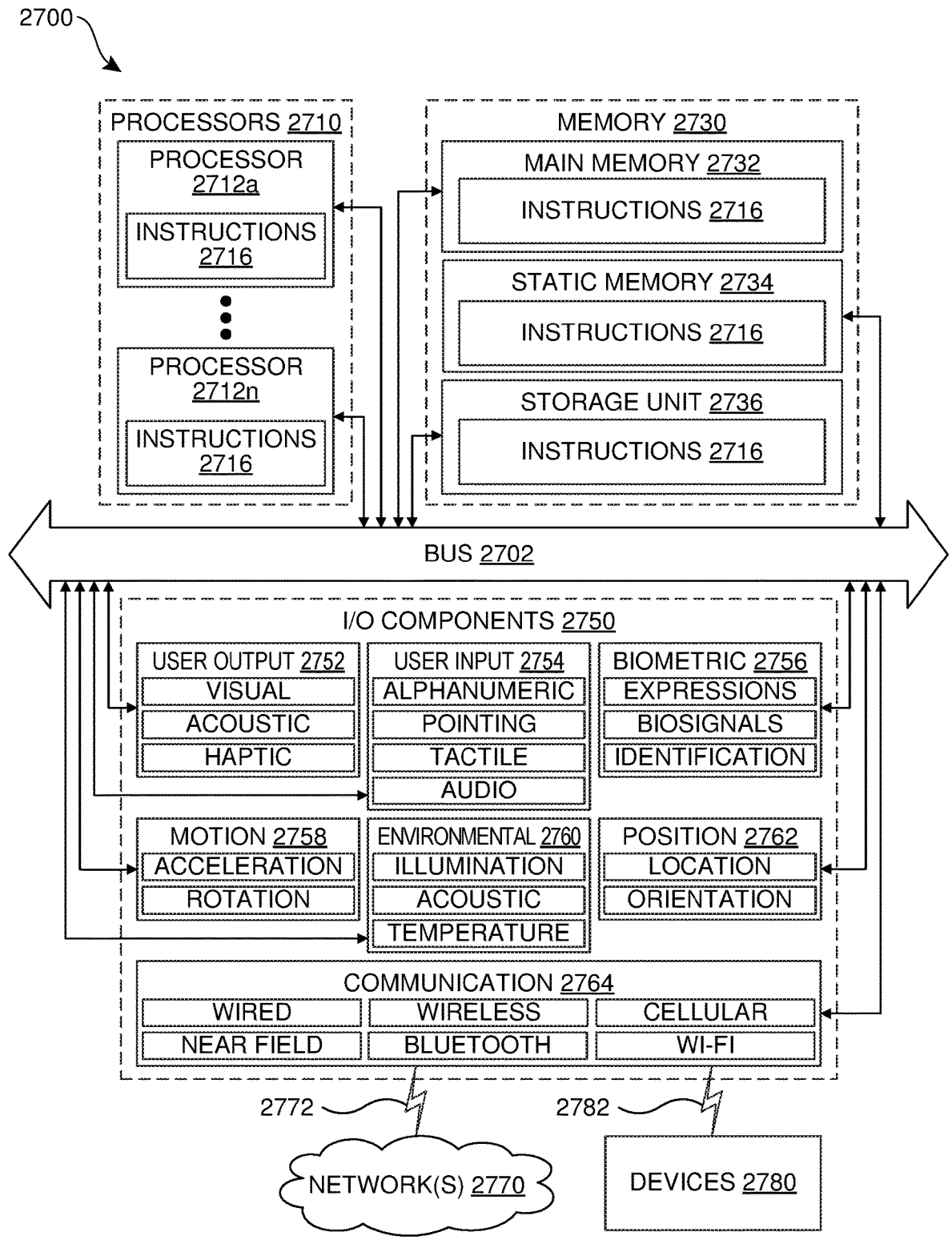
FIG. 27 is a block diagram illustrating components of an example machine configured to read instructions from a machine-readable medium and perform any of the features described herein.

FIG. 27 is a block diagram illustrating components of an example machine 2700 configured to read instructions from a machine-readable medium (for example, a machine-readable storage medium) and perform any of the features described herein. The example machine 2700 is in a form of a computer system, within which instructions 2716 (for example, in the form of software components) for causing the machine 2700 to perform any of the features described herein may be executed. As such, the instructions 2716 may be used to implement modules or components described herein. The instructions 2716 cause unprogrammed and/or unconfigured machine 2700 to operate as a particular machine configured to carry out the described features. The machine 2700 may be configured to operate as a standalone device or may be coupled (for example, networked) to other machines. In a networked deployment, the machine 2700 may operate in the capacity of a server machine or a client machine in a server-client network environment, or as a node in a peer-to-peer or distributed network environment. Machine 2700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2700 is illustrated, the term "machine" includes a collection of machines that individually or jointly execute the instructions 2716.

The machine 2700 may include processors 2710, memory 2730, and I/O components 2750, which may be communicatively coupled via, for example, a bus 2702. The bus 2702 may include multiple buses coupling various elements of machine 2700 via various bus technologies and protocols. In an example, the processors 2710 (including, for example, a central processing unit (CPU), a graphics processing unit (GPU), a digital signal processor (DSP), an ASIC, or a suitable combination thereof) may include one or more processors $2712a$ to $2712n$ that may execute the instructions 2716 and process data. In some examples, one or more processors 2710 may execute instructions provided or identified by one or more other processors 2710. The term "processor" includes a multi-core processor including cores that may execute instructions contemporaneously. Although FIG. 27 shows multiple processors, the machine 2700 may include a single processor with a single core, a single processor with multiple cores (for example, a multi-core processor), multiple processors each with a single core, multiple processors each with multiple cores, or any combination thereof. In some examples, the machine 2700 may include multiple processors distributed among multiple machines.

The memory/storage 2730 may include a main memory 2732, a static memory 2734, or other memory, and a storage unit 2736, both accessible to the processors 2710 such as via the bus 2702. The storage unit 2736 and memory 2732, 2734 store instructions 2716 embodying any one or more of the functions described herein. The memory/storage 2730 may also store temporary, intermediate, and/or long-term data for processors 2710. The instructions 2716 may also reside, completely or partially, within the memory 2732, 2734, within the storage unit 2736, within at least one of the processors 2710 (for example, within a command buffer or cache memory), within memory at least one of I/O components 2750, or any suitable combination thereof, during execution thereof. Accordingly, the memory 2732, 2734, the storage unit 2736, memory in processors 2710, and memory in I/O components 2750 are examples of machine-readable media.

As used herein, "machine-readable medium" refers to a device able to temporarily or permanently store instructions and data that cause machine 2700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 2716) for execution by a machine 2700 such that the instructions, when executed by one or more processors 2710 of the machine 2700, cause the machine 2700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 2750 may include a wide variety of hardware components adapted to receive input, provide output, produce output, transmit information, exchange information, capture measurements, and so on. The specific I/O components 2750 included in a particular machine will depend on the type and/or function of the machine. For example, mobile devices such as mobile phones may include a touch input device, whereas a headless server or IoT device may not include such a touch input device. The particular examples of I/O components illustrated in FIG. 27 are in no way limiting, and other types of components may be included in machine 2700. The grouping of I/O components 2750 are merely for simplifying this discussion, and the grouping is in no way limiting. In various examples, the I/O components 2750 may include user output components 2752 and user input components 2754. User output components 2752 may include, for example, display components for displaying information (for example, a liquid crystal display (LCD) or a projector), acoustic components (for example, speakers), haptic components (for example, a vibratory motor or force-feedback device), and/or other signal generators. User input components 2754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2750 may include biometric components 2756, motion components 2758, environmental components 2760, and/or position components 2762, among a wide array of other physical sensor components. The biometric components 2756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 2758 may include, for example, acceleration sensors (for example, an accelerometer) and rotation sensors (for example, a gyroscope). The environmental components 2760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 2762 may include, for example, location sensors (for example, a Global Position System (GPS) receiver), altitude sensors (for example, an air pressure sensor from which altitude may be derived), and/or orientation sensors (for example, magnetometers).

The I/O components 2750 may include communication components 2764, implementing a wide variety of technologies operable to couple the machine 2700 to network(s) 2770 and/or device(s) 2780 via respective communicative couplings 2772 and 2782. The communication components 2764 may include one or more network interface components or other suitable devices to interface with the network(s) 2770. The communication components 2764 may include, for example, components adapted to provide wired communication, wireless communication, cellular communication, Near Field Communication (NFC), Bluetooth communication, Wi-Fi, and/or communication via other modalities. The device(s) 2780 may include other machines or various peripheral devices (for example, coupled via USB).

In some examples, the communication components 2764 may detect identifiers or include components adapted to detect identifiers. For example, the communication components 2764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 2762, such as, but not limited to, geo-location via Internet Protocol (IP) address, location via Wi-Fi, cellular, NFC, Bluetooth, or other wireless station identification and/or signal triangulation.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for interacting with a three-dimensional (3D) virtual environment, the system comprising a logic subsystem and one or more machine readable media having instructions stored thereon which, when executed by the logic subsystem, cause the system to:
   receive a first user input for selecting a first virtual object in the 3D virtual environment;
   identify, at a first time in response to the first user input, the first virtual object as a currently selected virtual object;
   receive a second user input for activating an object reorientation mode in which an orientation of a reference object is manipulated to change an orientation of the first virtual object;
   activate, at a second time in response to the second user input, the object reorientation mode;
   receive, at or before a third time, a third user input indicating changes in pose of a hand;
   change the orientation of the reference object to a first orientation responsive to the third user input;
   receive, at the third time while the first virtual object has remained a currently selected virtual object since the first time and while the object reorientation mode has remained active since the second time, a fourth user input; and
   change, in response to receiving the fourth user input, an object space orientation of the first virtual object to having the first orientation of the reference object from a different second orientation.

2. The system of claim 1, wherein the instructions further cause the system to:
   display, while the object reorientation mode is active, a user-directed object selection ray;
   identify, based on at least the received third user input, a first object selection pose of the user-directed object selection ray for the third time;

determine that, in the first object selection pose for the third time, the user-directed object selection ray is pointed at a second virtual object; and
select the second virtual object as the reference object based on the determination that the user-directed object selection ray is pointed at the second virtual object.

3. The system of claim 2, wherein:
the first virtual object is a complex object including a plurality of component objects, the plurality of component objects including a first component virtual object; and
the second virtual object is the first component object.

4. The system of claim 2, wherein the instructions further cause the system to:
determine that, in a second object selection pose for a fourth time after the first time and before the third time, the user-directed object selection ray is pointed at the second virtual object; and
display, at the fourth time, an indication of the first orientation in association with the second virtual object.

5. The system of claim 2, further comprising displaying an object reorientation tool element in association with a first controller avatar associated with a first hand,
wherein the second user input includes a first user navigation input moving a portion of a different second controller avatar into proximity and/or contact with the object reorientation tool element.

6. The system of claim 1, wherein the instructions further cause the system to display, at a fourth time after the first time and before the third time, a 3D bounding box for the first virtual object, wherein the bounding box is aligned with the object space orientation of the first virtual object and the object space orientation is the first orientation at the fourth time, wherein:
the bounding box is the reference object, and
the instructions further cause the system to rotate the first virtual object from the first orientation to the second orientation based on the third user input.

7. The system of claim 1, wherein the instructions further cause the system to display, at a fourth time after the first time and before the third time, a 3D bounding box for the first virtual object, wherein the bounding box is aligned with a second object space orientation at the fourth time, wherein:
the bounding box is the reference object, and
the instructions further cause the system to align the bounding box with the first orientation based on the third user input.

8. The system of claim 7, wherein the instructions further cause the system to display an object reorientation element in association with a face of the bounding box, wherein:
the second user input includes a first user navigation input moving a portion of a controller avatar into proximity and/or contact with the object reorientation element;
the third user input includes a second user navigation input moving the controller avatar; and
the instructions further cause the system to change an orientation of the face of the bounding box according to movement of the controller avatar resulting from the second user navigation input.

9. The system of claim 1, wherein the instructions further cause the system to, in response to the receipt of the fourth user input:
unparent a second virtual object from the first virtual object before the changing of the object space orientation of the first virtual object the first orientation; and
parent the second virtual object to the first virtual object, with the second virtual object becoming a child object of the first virtual object, after the object space orientation of the first virtual object is change to the first orientation, wherein:
the second virtual object has a third orientation with respect to a global space orientation while being a child object of the first virtual object before the unparenting of the second virtual object from the first virtual object, and
the second virtual object has the third orientation with respect to the global space orientation while being a child object of the first virtual object after the parenting of the second virtual object to the first virtual object.

10. The system of claim 1, further comprising:
a head mounted display unit; and
a three-dimensional hand pose tracking subsystem configured to determine changes in pose of the hand based on tracking of a three-dimensional hand pose tracking apparatus held and manipulated by the hand,
wherein the instructions further cause the system to present the 3D virtual environment via the head mounted display unit.

11. A method for interacting with a three-dimensional (3D) virtual environment, the method comprising:
receiving a first user input for selecting a first virtual object in the 3D virtual environment;
identifying, at a first time in response to the first user input, the first virtual object as a currently selected virtual object;
receiving a second user input for activating an object reorientation mode;
activating, at a second time in response to the second user input, an object reorientation mode in which an orientation of a reference object is manipulated to change an orientation of the first virtual object;
receiving, at or before a third time, a third user input indicating changes in pose of a hand;
changing the orientation of the reference object to a first orientation responsive to the third user input receiving, at the third time while the first virtual object has remained a currently selected virtual object since the first time and while the object reorientation mode has remained active since the second time, a fourth user input; and
changing, in response to receiving the fourth user input, an object space orientation of the first virtual object to having the first orientation of the reference object from a different second orientation.

12. The method of claim 11, further comprising:
displaying, while the object reorientation mode is active, a user-directed object selection ray;
identifying, based on at least the received third user input, a first object selection pose of the user-directed object selection ray for the third time;
determining that, in the first object selection pose for the third time, the user-directed object selection ray is pointed at a second virtual object; and
selecting the second virtual object as the reference object based on the determination that the user-directed object selection ray is pointed at the second virtual object.

13. The method of claim 12, wherein:
the first virtual object is a complex object including a plurality of component objects, the plurality of component objects including a first component virtual object; and the second virtual object is the first component virtual object.

14. The method of claim 12, further comprising:
determining that, in a second object selection pose for a fourth time after the first time and before the third time, the user-directed object selection ray is pointed at the second virtual object; and
displaying, at the fourth time, an indication of the first orientation in association with the second virtual object.

15. The method of claim 12, further comprising displaying an object reorientation tool element in association with a first controller avatar associated with a first hand,
wherein the second user input includes a first user navigation input moving a portion of a different second controller avatar into proximity and/or contact with the object reorientation tool element.

16. The method of claim 11, further comprising displaying, at a fourth time after the first time and before the third time, a 3D bounding box for the first virtual object, wherein the bounding box is aligned with the object space orientation of the first virtual object and the object space orientation is the first orientation at the fourth time, wherein:
the bounding box is the reference object, and
the method further comprises rotating the first virtual object from the first orientation to a second orientation based on the third user input.

17. The method of claim 11, further comprising displaying, at a fourth time after the first time and before the third time, a 3D bounding box for the first virtual object, wherein the bounding box is aligned with the second object space orientation at the fourth time, wherein:
the bounding box is the reference object, and
the method further comprises aligning the bounding box with the first orientation based on the third user input.

18. The method of claim 17, further comprising displaying an object reorientation element in association with a face of the bounding box, wherein:
the second user input includes a first user navigation input moving a portion of a controller avatar into proximity and/or contact with the object reorientation element;
the third user input includes a second user navigation input moving the controller avatar; and
the method further includes changing an orientation of the face of the bounding box according to movement of the controller avatar resulting from the second user navigation input.

19. The method of claim 11, further comprising, in response to the receipt of the fourth user input:
unparenting a second virtual object from the first virtual object before the changing of the object space orientation of the first virtual object the first orientation; and
parenting the second virtual object to the first virtual object, with the second virtual object becoming a child object of the first virtual object, after the object space orientation of the first virtual object is change to the first orientation, wherein:
the second virtual object has a third orientation with respect to a global space orientation while being a child object of the first virtual object before the unparenting of the second virtual object from the first virtual object, and
the second virtual object has the third orientation with respect to the global space orientation while being a child object of the first virtual object after the parenting of the second virtual object to the first virtual object.

20. A machine readable medium including instructions which, when executed by one or more processors included in a head-mounted mixed reality device, cause the mixed reality device to perform the method of claim 11.

* * * * *